(12) United States Patent
Kimura et al.

(10) Patent No.: US 8,095,721 B2
(45) Date of Patent: Jan. 10, 2012

(54) NETWORK SWITCH AND METHOD OF SWITCHING IN NETWORK

(75) Inventors: Isao Kimura, Yokohama (JP); Mitsuo Yamamoto, Hino (JP); Michitaka Okuno, Kokubunji (JP)

(73) Assignee: ALAXALA Networks Corporation, Kanagawa (JP)

( * ) Notice: Subject to any disclaimer, the term of this patent is extended or adjusted under 35 U.S.C. 154(b) by 561 days.

(21) Appl. No.: 12/276,677

(22) Filed: Nov. 24, 2008

(65) Prior Publication Data

US 2009/0198864 A1    Aug. 6, 2009

(30) Foreign Application Priority Data

Feb. 5, 2008   (JP) .................................. 2008-025189

(51) Int. Cl.
*G06F 13/14* (2006.01)
*H04L 12/00* (2006.01)
(52) U.S. Cl. ......................... 710/317; 370/351; 370/357
(58) Field of Classification Search .................... 710/38, 710/316, 317; 370/351–352, 355–357, 359, 370/360, 362
See application file for complete search history.

(56) References Cited

U.S. PATENT DOCUMENTS

| | | | | |
|---|---|---|---|---|
| 5,959,995 A * | 9/1999 | Wicki et al. | ..................... | 370/400 |
| 7,079,525 B1 * | 7/2006 | Goldstein et al. | ............. | 370/352 |
| 7,249,207 B2 * | 7/2007 | Check et al. | ..................... | 710/65 |
| 7,298,752 B2 * | 11/2007 | Moriwaki et al. | ............. | 370/401 |
| 7,680,097 B1 * | 3/2010 | Goldstein et al. | ............. | 370/351 |
| 2002/0099900 A1 * | 7/2002 | Kawarai et al. | ............... | 710/317 |
| 2007/0097948 A1 * | 5/2007 | Boyd et al. | ..................... | 370/351 |

FOREIGN PATENT DOCUMENTS

| | | |
|---|---|---|
| JP | 5219111 | 8/1993 |
| JP | 2005-045626 | 2/2005 |
| JP | 2008-092485 | 4/2008 |
| JP | 2008-166888 | 7/2008 |

* cited by examiner

*Primary Examiner* — Mark Rinehart
*Assistant Examiner* — Trisha Vu
(74) *Attorney, Agent, or Firm* — Brundidge & Stanger, P.C.

(57) ABSTRACT

A network switch with a plurality of crossbar switches that is available to suppress increase in the circuit scale is provided. The network switch has: the plurality of crossbar switches that transfer unit data in a specified format; a receiving side transfer unit that transfers data received from a network to the plurality of crossbar switches in the unit data basis; and a plurality of transmitting side transfer units that transmit data transferred from the plurality of crossbar switches to the network. The receiving side transfer sets a consecutive serial number to the unit data in transfer sequence, and distributes the unit data to the plurality of crossbar switches. Each of the plurality of transmitting side transfer units has a plurality of queues for the respective crossbar switches that stores the transferred unit data, and extracts the unit data with smallest serial number of the unit data stored in the queues when all of the queues store the unit data.

7 Claims, 20 Drawing Sheets

Fig.8

ALLOCATING CELL DESTINATIONS TO ALL DATA FLOW

| CELL DESTINATION | 0 | 1 | 2 | 3 | 4 | 5 | 6 | 7 | |
|---|---|---|---|---|---|---|---|---|---|
| 1 | 1 | 0 | 0 | 0 | 0 | 0 | 0 | 0 | UNICAST |
| 2 | 0 | 1 | 0 | 0 | 0 | 0 | 0 | 0 | |
| 3 | 0 | 0 | 1 | 0 | 0 | 0 | 0 | 0 | |
| 4 | 0 | 0 | 0 | 1 | 0 | 0 | 0 | 0 | |
| 5 | 0 | 0 | 0 | 0 | 1 | 0 | 0 | 0 | |
| 6 | 0 | 0 | 0 | 0 | 0 | 1 | 0 | 0 | |
| 7 | 0 | 0 | 0 | 0 | 0 | 0 | 1 | 0 | |
| 8 | 0 | 0 | 0 | 0 | 0 | 0 | 0 | 1 | |
| 9 | 1 | 1 | 0 | 0 | 0 | 0 | 0 | 0 | MULTICAST TO 2 DESTINATIONS |
| 10 | 1 | 0 | 1 | 0 | 0 | 0 | 0 | 0 | |
| 11 | 1 | 0 | 0 | 1 | 0 | 0 | 0 | 0 | |
| ⋮ | ⋮ | ⋮ | ⋮ | ⋮ | ⋮ | ⋮ | ⋮ | ⋮ | |
| | 0 | 0 | 0 | 0 | 0 | 0 | 1 | 1 | |
| | 1 | 1 | 1 | 0 | 0 | 0 | 0 | 0 | MULTICAST TO 3 DESTINATIONS |
| ⋮ | ⋮ | ⋮ | ⋮ | ⋮ | ⋮ | ⋮ | ⋮ | ⋮ | |
| | 0 | 0 | 0 | 0 | 0 | 1 | 1 | 1 | |
| ⋮ | ⋮ | ⋮ | ⋮ | ⋮ | ⋮ | ⋮ | ⋮ | ⋮ | |
| 254 | 0 | 1 | 1 | 1 | 1 | 1 | 1 | 1 | |
| 255 | 1 | 1 | 1 | 1 | 1 | 1 | 1 | 1 | |

Fig.9

ALLOCATING DATA FLOW TO K CELL DESTINATIONS

| CELL DESTINATION | 0 | 1 | 2 | 3 | 4 | 5 | 6 | 7 |
|---|---|---|---|---|---|---|---|---|
| 1 | 1 | 0 | 0 | 0 | 0 | 0 | 0 | 0 |
| 2 | 0 | 1 | 0 | 0 | 0 | 0 | 0 | 0 |
| 3 | 0 | 0 | 0 | 0 | 0 | 0 | 0 | 1 |
| ⋮ | ⋮ | ⋮ | ⋮ | ⋮ | ⋮ | ⋮ | ⋮ | ⋮ |
| K-2 | 1 | 1 | 1 | 1 | 1 | 1 | 1 | 1 |
| K-1 | 1 | 1 | 0 | 0 | 0 | 0 | 0 | 0 |
| K | 1 | 1 | 1 | 1 | 0 | 0 | 0 | 0 |

Fig. 10 WHEN TRANSFERRING A PLURALITY OF DESTINATIONS WITH CROSSBAR SWITCHES

NETWORK SWITCH AND METHOD OF SWITCHING IN NETWORK

CROSS-REFERENCE TO RELATED APPLICATIONS

The present application claims the priority based on Japanese Patent Application No. 2008-25189 filed on Feb. 5, 2008, the disclosure of which is hereby incorporated herein by reference in its entirety.

BACKGROUND OF THE INVENTION

1. Field of the Invention

The present invention relates to switching technology for transferring data in a network.

2. Description of the Related Art

In a network switch, switching of a packet to the external device as the packet destination is performed by transferring a packet received from an external device connected to an input port to an output port specified based on the destination contained in the packet. In order to perform transfer of data between the input port and the output port at a higher speed, certain network switch uses a plurality of crossbar switches for transferring data from a receiving side transfer device with the input port to a transmitting side transfer device with the output port. With the network switch using the crossbar switches, typically, the received packet is divided into cells of a specified data length, and the divided cells are transferred by the plurality of crossbar switches.

In the case that the cells divided from the packet are transferred by the plurality of crossbar switches, the arrival sequence to the transmitting side transfer device of the cells that are transmitted through mutually different crossbar switches does not always match the transfer sequence to the crossbar switches from the receiving side transfer device. When the cell arrival sequence is not guaranteed, there is a case that the packet is not able to be properly restored from the cells due to incorrect cell sequence. In light of this, a conventional network switch sets serial numbers for each cell destination (CSN: cell serial number) of the crossbar switches at the receiving side transfer device, and cells are sorted in CSN sequence with a sorting process at the transmitting side transfer device.

However, if a CSN is set for each cell destination, as the number of transmitting side transfer devices increases, the number of circuits such as CSN setting circuits for setting the CSN increases. This causes increase of circuit scale of the network switch. In particular, when performing multicast transfer for transferring single cells to a plurality of transmitting side transfer devices at the crossbar switches, the number of circuits such as CSN setting circuits increases rapidly in accordance with the increase in the transmitting side transfer devices. This problem is not limited to when dividing a packet into cells and transferring the divided cells, but is common where it is required to maintain the transfer sequence of the unit data such as packets, cells and so on.

SUMMARY

An object of the present invention is to suppress the increase in the circuit scale of the network switch using a plurality of crossbar switches.

According to an aspect of the present invention, a network switch is provided. The network switch comprises: a plurality of crossbar switches that transfer unit data in a specified format; a receiving side transfer unit that transfers data received from a network to the plurality of crossbar switches in the unit data basis; and a plurality of transmitting side transfer units that transmit data transferred from the plurality of crossbar switches to the network, wherein the receiving side transfer unit has; a serial number setting unit that sets a consecutive serial number to the unit data in transfer sequence to the crossbar switches regardless of whether transfer destination of the data unit with the crossbar switch is same or not; and a distributing unit that distributes the unit data to the plurality of crossbar switches, the unit data to be distributed being set the serial number, each of the plurality of transmitting side transfer units has: a plurality of queues that individually stores the unit data transferred from each crossbar switch for the respective crossbar switches; and a unit data extraction unit that extracts the unit data with smallest serial number of the unit data stored at beginning of the plurality of queues when all of the plurality of queues store the unit data.

With this arrangement, a consecutive serial number is set to the unit data in transfer sequence to the crossbar switches regardless of whether transfer destination of the unit data with the crossbar switch is same or not. By setting serial number in this way, it is possible to suppress an increase in the number of serial number setting units, and to suppress an increase in the circuit scale of the network switch, even when the number of transmitting side transfer units increases. Furthermore, with this arrangement, the transmitting side transfer unit extracts the unit data with smallest serial number of the unit data stored at the beginning of the plurality of queues when all of the plurality of queues store the unit data. This allows matching of the unit data extraction sequence to the transfer sequence from the receiving side transfer unit to the crossbar switches.

The receiving side transfer unit may be configured to transfer synchronous unit data for causing a specific transmitting side transfer unit to extract the unit data when the receiving side transfer unit does not receive data to be transferred to the specific transmitting side transfer unit for a specific duration.

With this arrangement, when the data to be transferred to a specific transmitting side transfer unit is not received for a specified duration, synchronous unit data is transferred for causing the specific transmitting side transfer unit to extract the unit data. As a result, even when unit data is not stored in all the plurality of queues and reception of data by the receiving side transfer unit discontinues, it is possible to extract unit data with a guaranteed sequence more securely.

The serial number setting unit may be configured to generate wrap around notification unit data for notifying occurrence of wrap around to the plurality of transmitting side transfer units when wrap around occurs with the serial number.

With this arrangement, when wrap around occurs with the serial numbers, wrap around notification unit data is transferred to the transmitting side transfer unit. The unit data extraction unit that extracts unit data with the smallest serial number may recognize occurrence of the wrap around by the notification unit data. So it is possible to facilitate suppression of erroneous extraction of the unit data due to the occurrence of the wrap around.

It is also available to use a cell of a specified data length as the unit data. In this case, the receiving side transfer unit may have a packet dividing unit that divides a packet received by the network switch into a plurality of cells, and that transfers the cells to the serial number setting unit in the packet basis, and each of the transmitting side transfer units may have a packet restoring unit that restores the packet from the cells transferred from the crossbar switches.

With this arrangement, the receiving side transfer unit generates cells from a packet. In general, a cell of a specified data length is suitable for transfer by the crossbar switches. In consequence, the crossbar switch may transfer the data received by the receiving side transfer unit in more suitable manner.

It is also available that the packet dividing unit may have an identifier appending unit that appends an identifier to each of the plurality of the cells, the identifier indicating a position of each of the cell within the packet, and the packet restoring unit has an identifier determination unit that determines whether or not the packet is able to be suitably restored based on the identifier appended to each of the cells.

With this arrangement, it is possible to determine whether or not unit data is properly transferred from the receiving side transfer unit to the crossbar switches, and from the crossbar switch to the transmitting side transfer unit.

It is also available to configure each of the crossbar switches is configured so as to be able to transfer a single unit data supplied from the receiving side transfer unit to at least two transmitting side transfer units among the plurality of transmitting side transfer units as individual unit data that are corresponding to the at least two transmitting side transfer units.

Even in a case that single unit data is transferred as individual unit data respectively corresponding to the at least two transmitting side transfer units at the crossbar switches, it is possible to suppress a rapid increase in the number of serial number setting units accompanied with an increase in the transmitting side transfer units. In consequence, with this arrangement, it is possible to further suppress an increase in the circuit scale of the network switch.

The present invention is able to be realized in various modes. For example, it is able to be realized in modes such as a network switch, a switching method in a network, a computer program for realizing the functions of that device or method, a recording medium for recording that computer program, data signals embedded within carrier waves containing that computer program and so on.

These and other objects, features, aspects, and advantages of the present invention will become more apparent from the following detailed description of the preferred embodiments with the accompanying drawings.

BRIEF DESCRIPTION OF THE DRAWINGS

FIG. 8 shows the way of allocating cell destinations to all the cell transfer patterns;

FIG. 9 shows an example of registering data flow to K cell destinations;

DESCRIPTION OF THE PREFERRED EMBODIMENT

A. Embodiment

Figure 1:
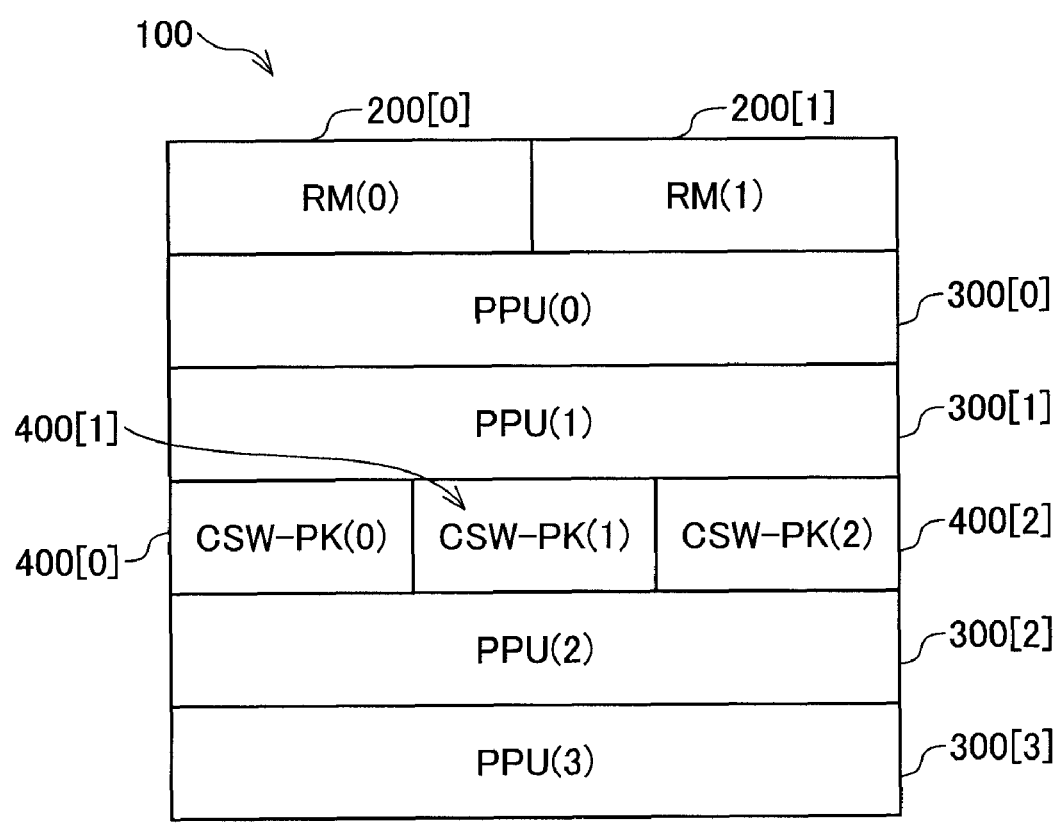
FIG. 1 is an explanatory drawing showing the schematic configuration of a network switch.

FIG. 1 is an explanatory drawing showing the schematic configuration of a network switch 100 as an embodiment of the present invention. With this embodiment, the network switch 100 has two routing managers (RM) 200, four packet processing units (PPU) 300, and three crossbar switch boards (CSW-PK) 400 on which are placed crossbar switches (CSW). In this specification, when the two routing managers 200 are to be distinguished, they are noted as the routing manager 200[0] or the routing manager 200[1]. Also, in the drawings, they are noted as RM(0) or RM(1). The packet processing units 300, the crossbar switch boards 400, and other components are described in the same manner.

The routing manager 200 controls the operation of the crossbar switch board 400 and the packet processing unit 300. The routing manager 200 also performs routing information creation and updating, and distribution of the created and updated routing information to the packet processing unit 300. With this embodiment, the routing manager 200 is configured as a double-redundant system. Therefore, one of the two routing managers 200[0] and 200[1] executes processing as the routing manager 200 of the actual use system, and the remaining is used as the spare system during failure occurrence with the actual use system routing manager 200.

With this embodiment, the crossbar switch board 400 is also configured as a redundant system. In specific terms, the routing manager 200 operates the two crossbar switch boards 400[0] and 400[1] as the actual use system, and sets the remaining crossbar switch board 400[2] as the spare system in a non-operating state. In this case, when failure occurs with either of the crossbar switch boards 400[0] or 400[1], instead of the crossbar switch board 400 for which the failure occurred, the spare system crossbar switch board 400[2] goes to an operating state. In this way, by giving redundancy to the crossbar switch board 400, it is possible to increase the fault tolerance of the network switch 100. The operating state of the crossbar switch board 400 is not necessarily limited to this. For example, the three crossbar switch boards 400 may all be operated. This allows further increase of the data transfer capability with the network switch 100. It is also available to change the number of crossbar switch boards 400 that are operated according to the data traffic switched by the network switch 100. By working in this way, when there is little traffic, by reducing the number of operating crossbar switch boards 400, it is possible to further reduce the power consumption of the network switch 100.

Figure 2:
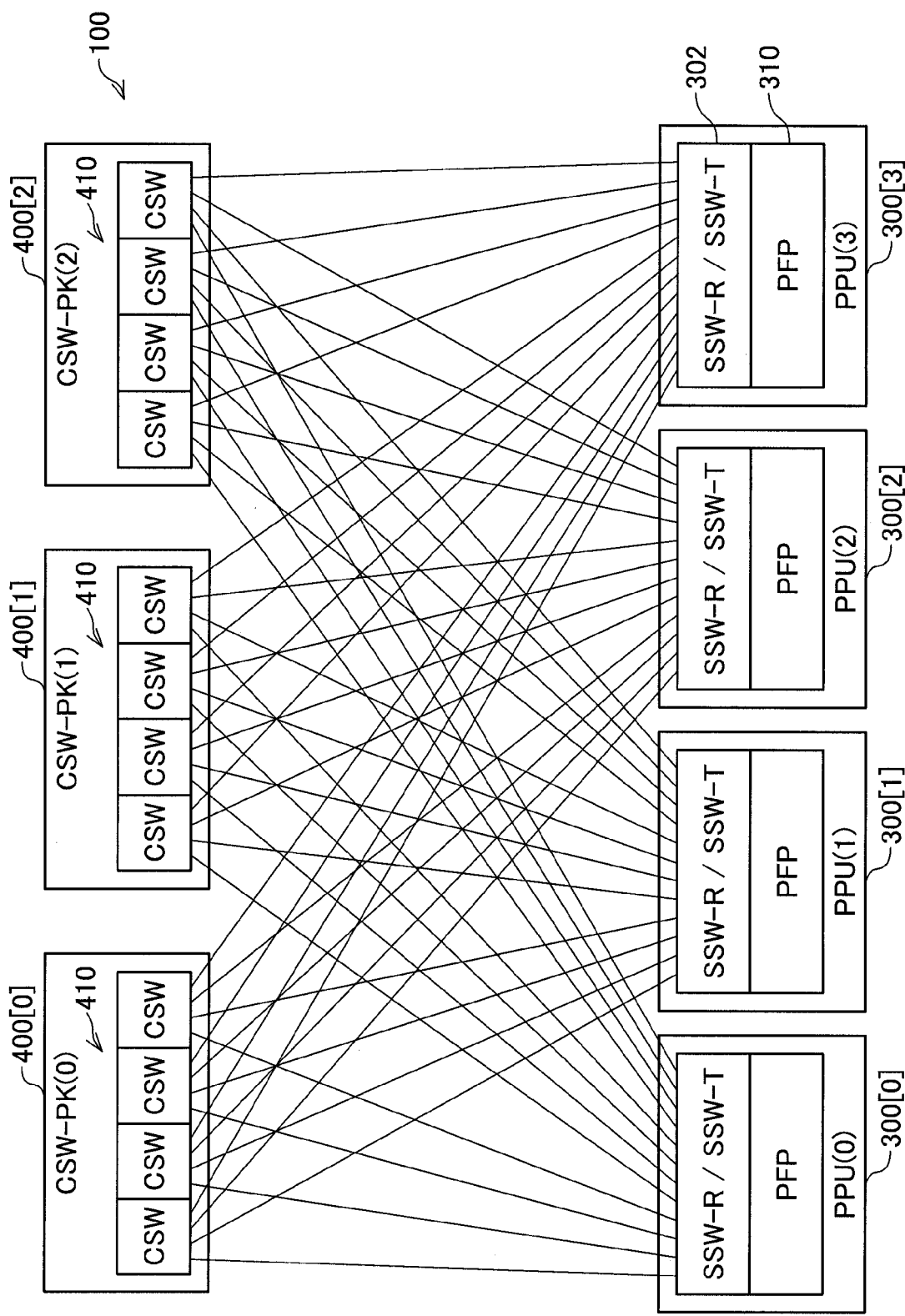
FIG. 2 is an explanatory drawing showing the connection state of the packet processing unit 300 and the crossbar switch board.

FIG. 2 is an explanatory drawing showing the connection state of the packet processing unit 300 and the crossbar switch board 400. With the example in FIG. 2, the crossbar switch boards (CSW-PK) 400 respectively have four crossbar switches (CSW) 410. With the example in FIG. 2, four crossbar switches 410 are provided in the crossbar switch board 400, but the number of crossbar switches 410 provided in the crossbar switch board 400 may be any number of one or more.

The packet processing units (PPU) 300 respectively have a packet forwarding processor (PFP) 310, and a sub crossbar switch 302. The sub crossbar switch 302 is normally configured by a receiving side sub crossbar switch (SSW-R) and a transmitting side sub crossbar switch (SSW-T). In FIG. 2, for convenience of the illustration, the receiving side crossbar switch (SSW-R) and the transmitting side crossbar switch (SSW-T) are depicted as a single sub crossbar switch 302. It is also possible to configure the receiving side sub crossbar switch (SSW-R) and the transmitting side sub crossbar switch (SSW-T) as an integrated unit.

Four packet processing units (PPU) 300[0] to 300[3] are connected to each of the crossbar switches 410. In this way, the configuration for which the four packet processing units (PPU) 300[0] to 300[3] are connected to the single crossbar switch (CSW) 410 is called as a "4×4 configuration." With the example in FIG. 2, the four crossbar switches 410 are used as different crossbar switches. It is also possible to use two crossbar switches (CSW) 410 respectively as a single crossbar switch depending on the configuration of the crossbar switches (CSW) 410. By using two crossbar switches 410 as single crossbar switches in this way, it is possible to double the number of packet processing units 300 connected to the crossbar switch (specifically, this is an 8×8 configuration).

Figure 3:
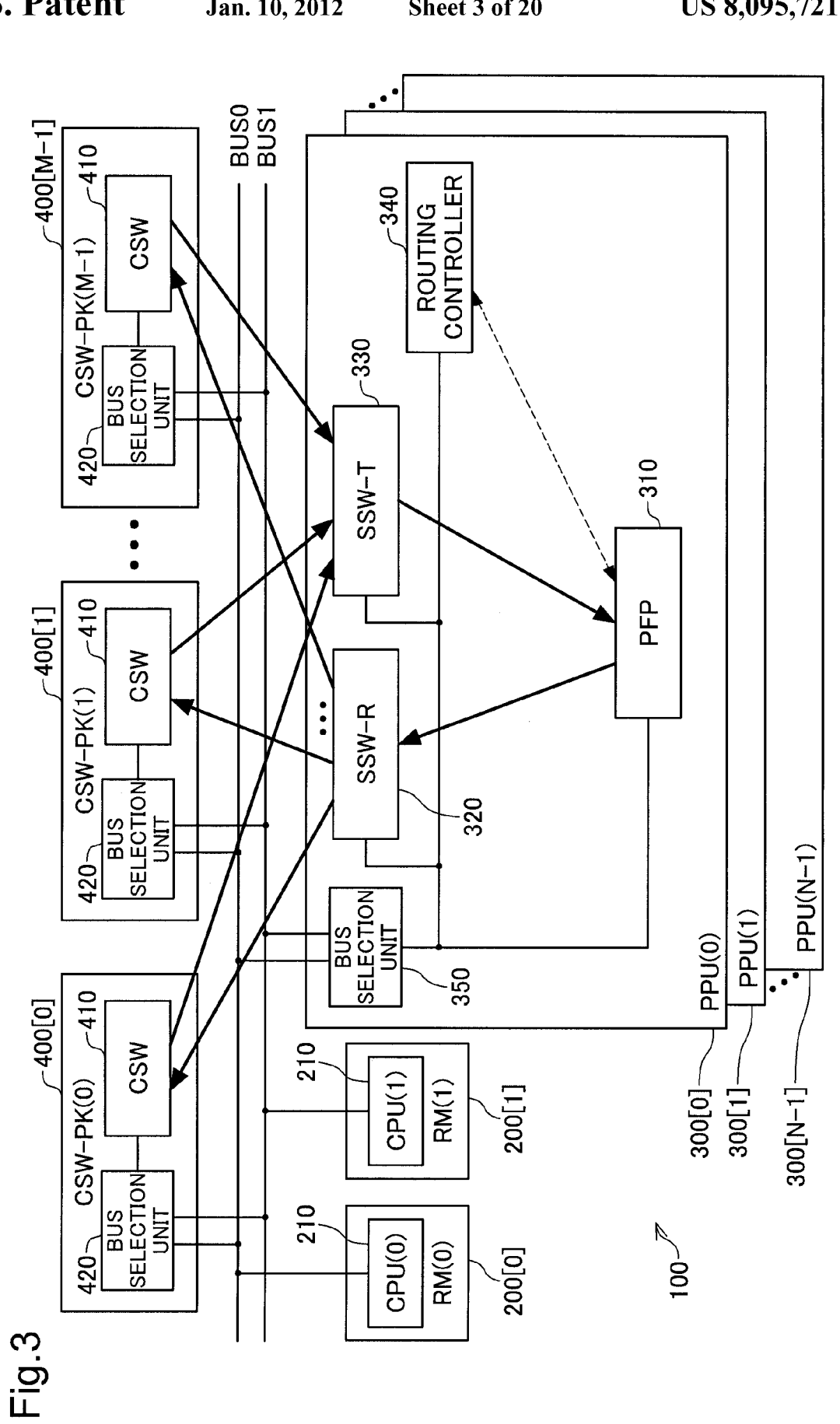
FIG. 3 is an explanatory drawing showing the configuration of each component of the network switch.

FIG. 3 is an explanatory drawing showing the configuration of each component of the network switch 100. FIG. 1 and FIG. 2 show examples for which the network switch 100 is configured by four packet processing units (PPU) 300, three crossbar switch boards (CSW-PK) 400, and two routing managers (RM) 200. In general, the number of packet processing units 300 and crossbar switch boards 400 may also be modified as appropriate. For this reason, in the description as follows, the number of packet processing units (PPU) is treated as N, and the number of crossbar switch boards (CSW-PK) 400 is treated as M, as shown in FIG. 3.

The packet processing unit (PPU) 300 has a packet forwarding processor (PFP) 310, a receiving side sub crossbar switch (SSW-R) 320, a transmitting side sub crossbar switch (SSW-T) 330, a routing controller 340, and a bus selection unit 350. Inside the packet processing unit 300, the bus selection unit 350 is connected to the packet forwarding processor 310, the receiving side sub crossbar switch 320, the transmitting side sub crossbar switch 330, and the routing controller 340. With the example in FIG. 3, one packet forwarding processor 310 is provided in each packet processing unit 300, but the number of packet forwarding processors 310 provided in the packet processing unit 300 may be any number of one or more.

The crossbar switch board 400 has the crossbar switch (CSW) 410 and the bus selection unit 420. Inside the crossbar switch board 400, the bus selection unit 420 is connected to the crossbar switch 410. As described above, the number of crossbar switches 410 provided in the crossbar switch board 400 is able to be any number of one or more. In light of this, hereafter, we will describe one crossbar switch 410 as being provided on one crossbar switch board 400.

Each routing manager (RM) 200 has a CPU 210. The CPU 210 realizes a function as the routing manager 200 by executing the computer program stored in the memory (not illustrated) provided in the routing manager 200. The two routing managers 200[0] and 200[1] are respectively connected to different buses BUS0 and BUS1. The bus selection units 350 and 420 provided in the packet processing unit 300 and the crossbar switch board 400 mediate transmitting and receiving of data with the routing manager 200 through the bus connected to the routing manager 200 of the actual use system among the two buses BUS0 and BUS1.

The routing controller 340 of the packet processing unit 300 delivers routing information supplied from the routing manager 200 to the packet forwarding processor 310. The packet forwarding processor 310 receives a packet subject to transfer from external ports which are not illustrated. The received packet is divided into cells (described later) at the packet forwarding processor 310, and the cells are delivered from the packet forwarding processor 310 to the receiving side sub crossbar switch 320. A cell destination specifying the packet processing unit 300 as the destination is appended to the cells delivered from the packet forwarding processor 310 to the receiving side sub crossbar switch 320. The cell destination is determined based on the routing information fetched by the packet forwarding processor 310 from the routing controller 340.

The receiving side sub crossbar switch 320 distributes and transfers the received cells to M crossbar switches 410. The crossbar switch 410 transfers the cells to the transmitting side sub crossbar switch 330 according to the cell destination. The transmitting side sub crossbar switch 330 restores the packet from cells, and delivers the restored packet to the packet forwarding processor 310. The packet forwarding processor 310 transmits the received packet from the external port specified based on the routing information fetched from the routing controller 340. In this way, a packet transferred to a certain external port is transferred to the external port specified based on the routing information, and packet transfer is performed at the network switch 100.

In this way, the packet forwarding processors (PFP) 310 and the receiving side sub crossbar switches (SSW-R) 320 function to transfer data received from the network to the crossbar switches (CSW) 410. So the packet forwarding processor 310 and the receiving side sub crossbar switch 320 are able to be referred to together as the "receiving side transfer unit." Also, the packet forwarding processor 310 and the transmitting side sub crossbar switch (SSW-T) 330 function to transmit the network the data transferred from the crossbar switch 410. So the packet forwarding processor 310 and the transmitting side sub crossbar switch 330 are able to be referred to together as the "transmitting side transfer unit."

FIGS. 4A and 4B are explanatory drawings showing division of the received packet into cells at the packet forwarding processor (PFP) 310. FIG. 4A is a block diagram showing the configuration of the function of dividing packets into cells at the packet forwarding processor 310. The packet forwarding processor 310 has a division processing unit 312 that divides packets into cells, a cell destination determination unit 314 that determines the cell destination to be appended to the cell, and a cell generating unit 316 that appends the cell destination to the divided cell and generates cells transferred to the receiving side sub crossbar switch (SSW-R) 320. These three units 312, 314, and 316 constitute a circuit that divide packets and generate cells. So these units 312, 314, and 316 may also be referred to together as "packet division circuits." The cells generated by the packet division circuit are stored in the queue 318, and are transferred from the queue 318 to the receiving side sub crossbar switch 320. The queues 318 are preferably provided individually for each of the transfer to a single packet processing unit (PPU) 300 (unicast transfer) and the transfer to a plurality of packet processing units 300 (multicast transfer). This facilitates to perform different processing for unicast transfer and multicast transfer at the receiving side sub crossbar switch 320. Furthermore, it is preferable that the queues 318 are provided individually for each cell transfer pattern (data flow), or for each flow of a bundled plurality of cell transfer patterns (data flow). This facilitates to perform different processing for each cell transfer pattern (data flow) at the receiving side sub crossbar switch 320.

FIG. 4B shows generation of cells from a packet (IP packets) of a format compliant with the internet protocol (IP). The packet used for cell generation is not necessarily to be an IP packet. A packet used for cell generation may be changed as appropriate according to the protocol that the network switch 100 is compatible with. In FIG. 4B, as shown by the arrow, the data transfer is performed in the sequence going from the right to left direction in the drawing.

The IP packet includes the IP header which contains information such as the destination IP address, and data transferred by the IP packet (IP datagram). The division processing unit 312 divides the received IP packet into a plurality of cell data. The number of the cell data divided from the IP packet is determined according to a predetermined cell data length (e.g. 32 bytes or 128 bytes). With the example of FIG. 4B, the IP packet is divided into four. In FIG. 4B, the cell data is generated from the overall IP packet including the IP header. It is also possible to generate cell data from IP datagram for which the IP header is removed.

The cell destination determination unit 314 determines the cell destination according to the destination IP address contained in the IP header. In specific terms, the packet processing unit 300 corresponding to the destination IP address is specified based on the routing information supplied from the routing controller 340 (FIG. 3). Then, based on the specified packet processing unit 300, the cell destination is determined. This cell destination is information for specifying the transfer destination of the cell from the crossbar switch 410. As the cell destination, it is possible to give an N bit bitmap representing the cell transfer pattern (data flow) at the crossbar switch 410, specifically, a bitmap representing the crossbar switch connection status. Also, as described later, it is possible to give a number correlated to the data flow (data flow number) as the cell destination.

The cell generating unit 316 appends a cell header containing the cell destination to the cell data generated by the division processing unit 312. As shown in FIG. 4B, the cell header contains the cell destination and the cell serial number (CSN). The CSN is not set at the cell generating unit 316. In this case, 0 is set as the CSN value, for example. For the CSN value, any other predetermined value may also be set. It is also available that the CSN has an undefined value. The cells generated at the cell generating unit 316, after being stored in the queue 318, are transferred to the receiving side sub crossbar switch 320. Note that the cell transfer from the packet forwarding processor 310 to the receiving side sub crossbar switch 320 is performed in packet basis before division.

When the IP packets transferred to the packet processing unit 300 (destination PPU) are discontinuous (specifically, when packets of a specific destination are not received in a predetermined time), the cell generating unit 316 generates a synchronous cell (dummy cell) for notifying the IP packet discontinuity, and transfers the synchronous cell to the receiving side sub crossbar switch 320. The synchronous cell may have any format as long as it is possible to distinguish the synchronous cell from a normal cell. For example, it is possible to provide a flag indicating whether or not it is a synchronous cell in the cell header, and to set the flag for the synchronous cell.

Figure 5:
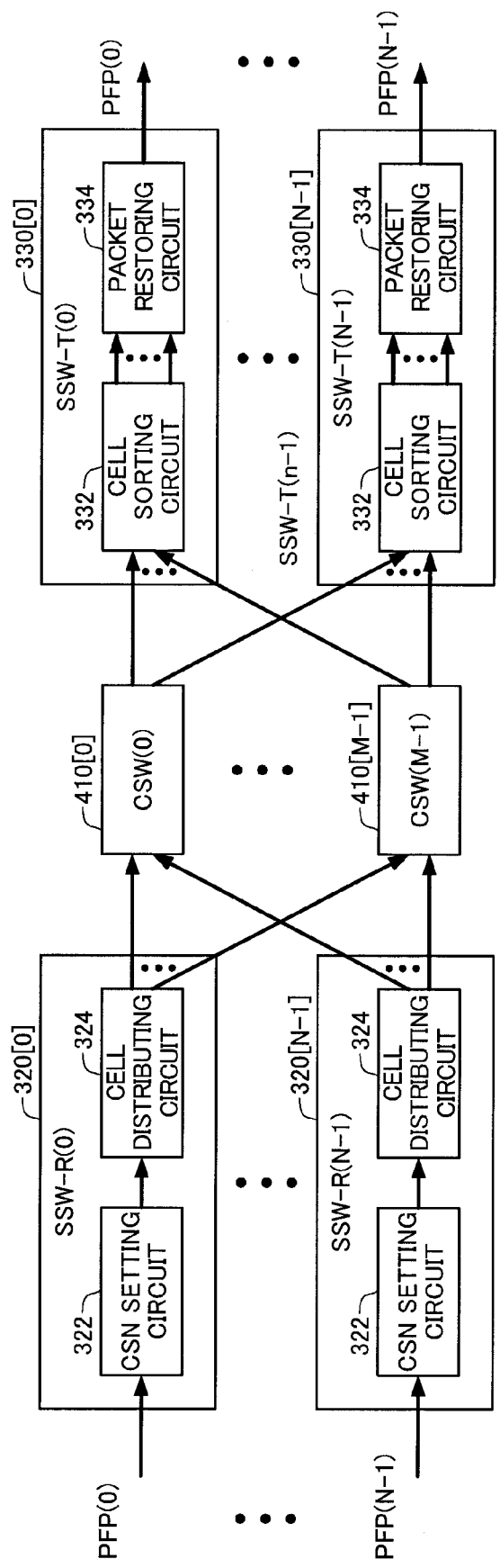
FIG. 5 is an explanatory drawing showing transfer of cells from the receiving side sub crossbar switch to the transmitting side sub crossbar switch.

FIG. 5 is an explanatory drawing showing transfer of cells from the receiving side sub crossbar switch (SSW-R) 320 to the transmitting side sub crossbar switch (SSW-T) 330. The receiving side sub crossbar switch 320 has a CSN setting circuit 322 and a cell distributing circuit 324. The transmitting side sub crossbar switch (SSW-T) 330 has a cell sorting circuit 332 and a packet restoring circuit 334. As shown in FIG. 5, the cells transferred from the packet forwarding processor (PFP) 310 to the receiving side sub crossbar switch 320 are transferred to the packet forwarding processor 310 via the CSN setting circuit 322, the cell distributing circuit 324, the crossbar switch (CSW) 410, the cell sorting circuit 332, and the packet restoring circuit 334. For the processing at these parts 322, 324, 410, 332, and 334 are described later.

Figure 6A:
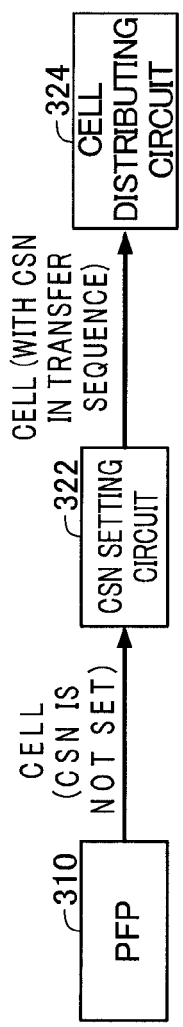
FIGS. 6A through 6C are explanatory drawings showing setting of the CSN to each cell at the CSN setting circuit.
Figure 6B:
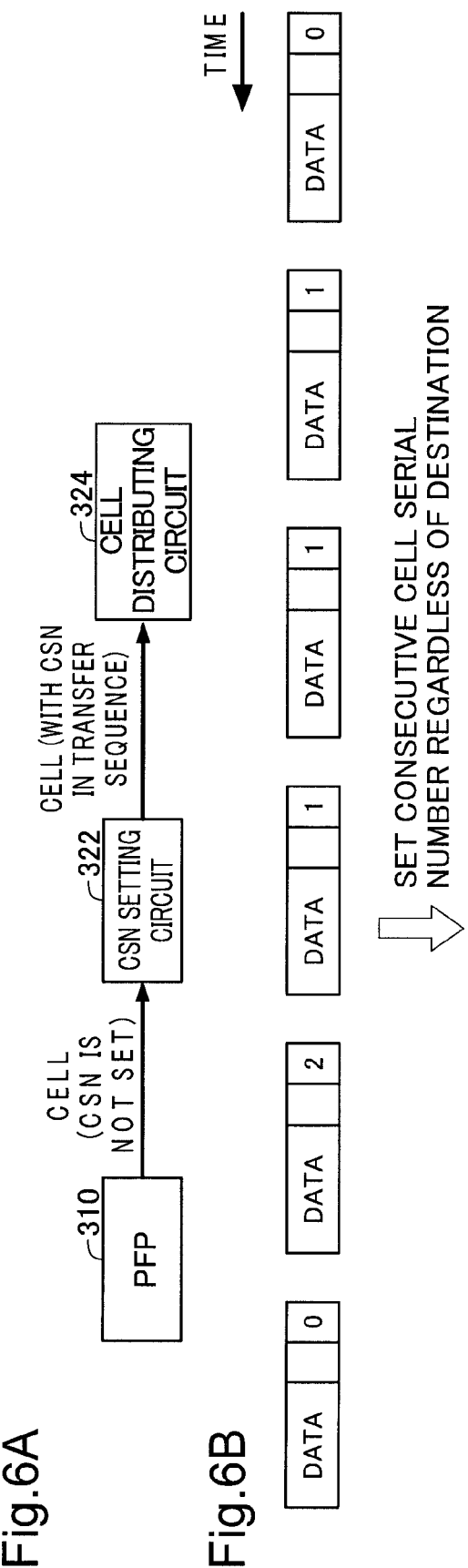
Figure 6C:
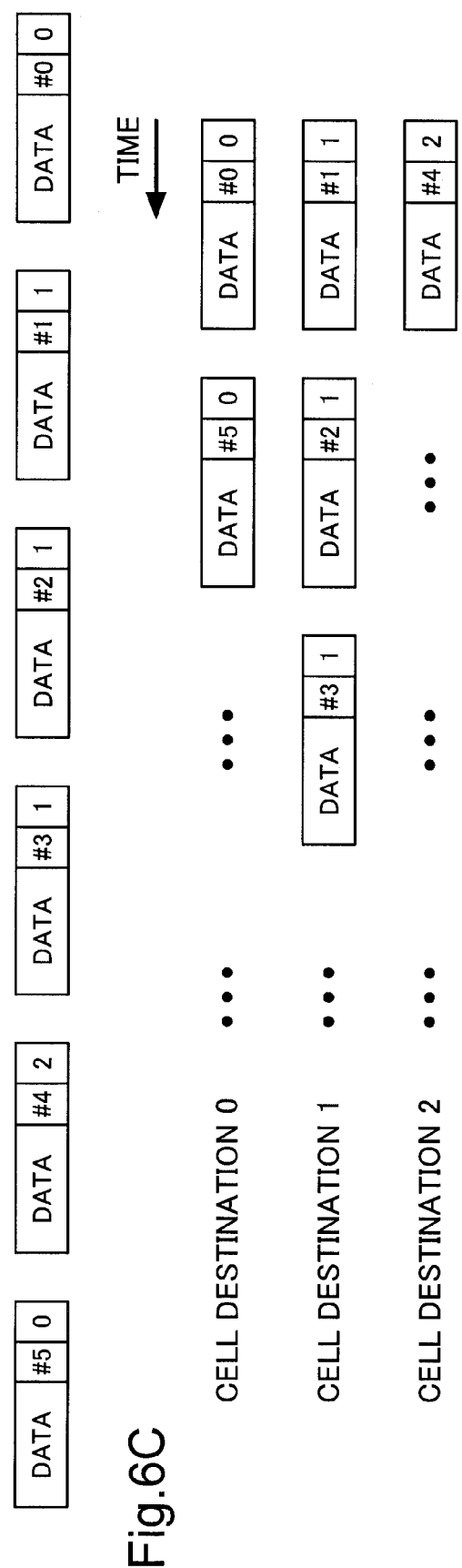

FIGS. 6A through 6C are explanatory drawings showing setting of the CSN to each cell at the CSN setting circuit 322. As shown in FIG. 6A, the CSN setting circuit 322 sets consecutive CSNs in the transfer sequence to the cells for which a CSN is not set that are transferred from the packet forwarding processor (PFP) 310. The cells with the CSN set at the CSN setting circuit 322 are delivered to the cell distributing circuit 324.

FIG. 6B shows setting of the CSNs to the cells. In FIG. 6B, as shown by the arrow, the data transfer is performed in the sequence of the direction from right to left in the drawing. In FIG. 6B, the cell destination is represented simply as a number, and the CSN is represented as a number with a prefix number sign (#). With this embodiment, as the CSN, a consecutive number is set in the cell transfer sequence regardless of the cell destination. The bit count allocated to the CSN in the cell header is predetermined. In this case, when the CSN exceeds the number that can be represented by the allocated bit count, CSN returns to 0 (called "wrap around"). When wrap around occurs in this way, the CSN setting circuit 322 generates a cell for notifying the occurrence of wrap around.

As shown in FIG. 3, a cell for which a CSN is set in transfer sequence in this way is transferred to the destination PPU via the crossbar switch (CSW) 410. At this time, as shown in FIG. 6C, at the destination PPU, the CSN of the received cell is not consecutive. In light of this, with this embodiment, as described later, at the transmitting side sub crossbar switch (SSW-T) 330, cell sorting circuits 332 corresponding to the respective transmitting source packet processing units (transmitting source PPU) 300 are provided. Then, queues corresponding to the crossbar switch 410 are provided in the individual cell sorting circuits 332. By taking out the cell with the smallest CSN from the cells stored in the queue, the sorted cells are obtained. The specific configuration and the function for performing cell sorting in this way are described later.

Figure 7A:
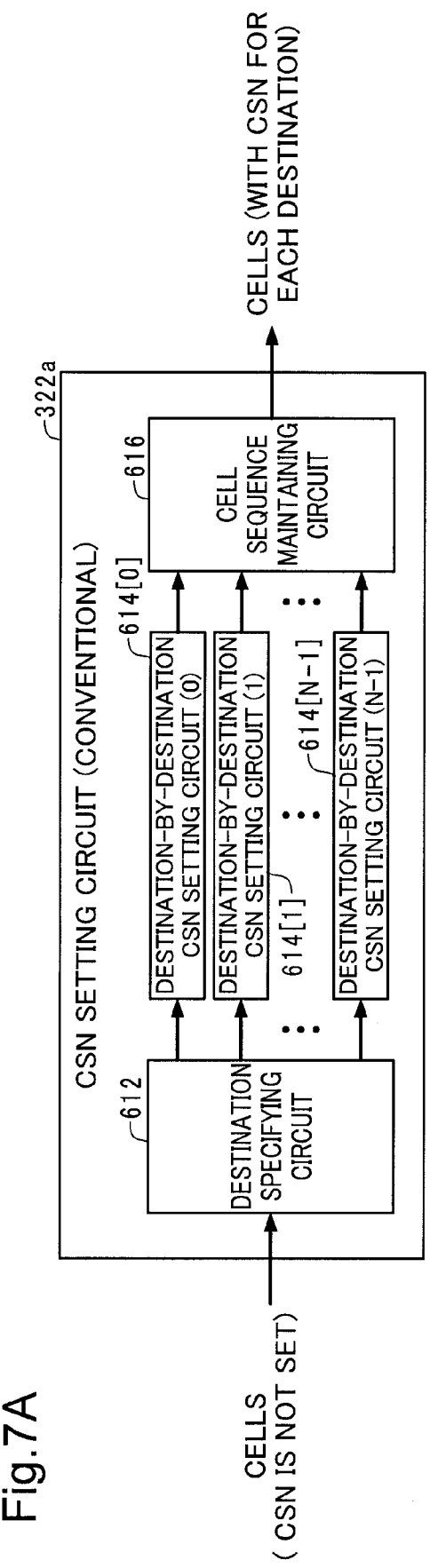
FIGS. 7A and 7B are explanatory drawings showing setting of CSNs being set to individual cells with a conventional CSN setting circuit.
Figure 7B:
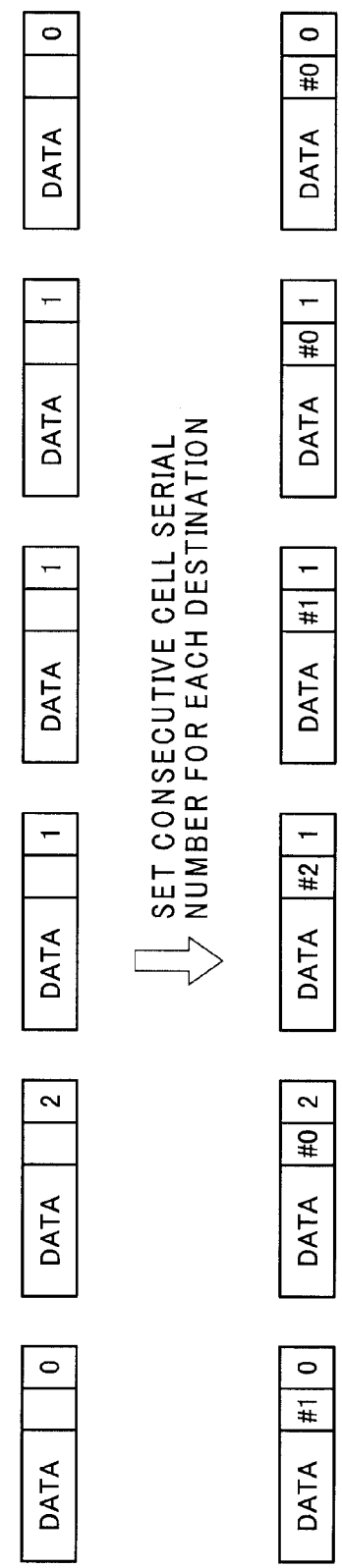

FIGS. 7A and 7B are explanatory drawings showing setting of CSNs being set to individual cells with a conventional CSN setting circuit 322a as a comparative example. The conventional CSN setting circuit 322a has a destination specifying circuit 612 for specifying the cell destination, a destination-by-destination CSN setting circuit 614, and a cell sequence maintaining circuit 616. The destination specifying circuit 612 specifies the cell destination of a cell for which the CSN is not set, and transfers the concerned cell to the destination-by-destination CSN setting circuit 614 corresponding to the cell destination. Each of the destination-by-destination CSN setting circuits 614 sets an individual consecutive number as the CSN to the transferred cells. The cell sequence maintaining circuit 616 transfers the cell transferred from the destination-by-destination CSN setting circuit 614 to the cell distributing circuit 324 (FIG. 5) in the sequence received at the CSN setting circuit 322a. Thus, with the conventional CSN setting circuit 322a, consecutive CSNs are set for each cell destination.

As will be described later, at the transmitting side sub crossbar switch (SSW-T) which is the cell transfer destination, a number of cell sorting circuits corresponding to the cell destinations are provided. Then, queues corresponding to the respective crossbar switches 410 are provided on each cell sorting circuit. The CSNs of the cells stored in the beginning of this queue are consecutive. In light of this, the CSN expected value (hereafter also called simply the "expected value") incremented one at a time each time a sorted cell is extracted is compared with the CSN of the queue beginning cell, and by extracting the cell for which the CSN is the expected value, it is possible to sort the cell.

However, in the case to set consecutive CSNs to the cells for each destination in this way, the number of the destination-by-destination CSN setting circuits 614 and the cell sorting circuits rapidly increases according with the increase in the number of packet processing units 300. FIG. 8 shows the way of allocating cell destinations to all the cell transfer patterns (data flow) when the number of packet processing units 300 is 8.

As shown in FIG. 8, in order to allow multicast transfer at the crossbar switch 410 (FIG. 5), the $2^N-1$ data flow is provided with the number of packet processing units 300 as N. As a consequence, when a cell destination is allocated for each data flow, it is required to provide $2^N-1$ of the destination-by-destination CSN setting circuit 614 and the cell sorting circuits corresponding to the cell destination. For example, when the number of packet processing units 300 is 8, it is required to provide 255 of the destination-by-destination CSN setting circuits 614 and the cell sorting circuits.

To avoid this kind of problem, it is possible to set a lower number of cell destinations than the number of the data flow, and to register the data flow in relation to each cell destination. FIG. 9 shows an example of registering data flow to K cell destinations.

This kind of data flow registration can be performed by allocating the used data flow to contents addressable memory (CAM) having K data areas (entries), for example. In this case, data flow of the entry count is already registered, and when using new data flow that is not registered in the CAM, the new data flow is registered in the entry of the least frequent use data flow. However, when performing data flow registration in this way, it is necessary to synchronize the data flow registration state between the destination-by-destination CSN setting circuit 614 and the cell sorting circuit. Therefore, the processing for synchronization becomes complex, and there is also the risk of an increase in overhead.

As described above, with a conventional network switch, when multicast transfer is performed at the crossbar switch 410, the number of the cell destination rapidly increases in accordance with the increase in the packet processing units 300. Therefore, with the conventional network switch, in order to prevent the increase in the number of the destination-by-destination CSN setting circuits 614 and the number of the cell sorting circuits, the transfer of cells to the multiple destination PPUs is performed without performing multicast transfer at the crossbar switch 410. In this case, multicast transfer is converted to unicast transfer to a single transfer destination by duplicating in advance the multicast cell.

Figure 10:
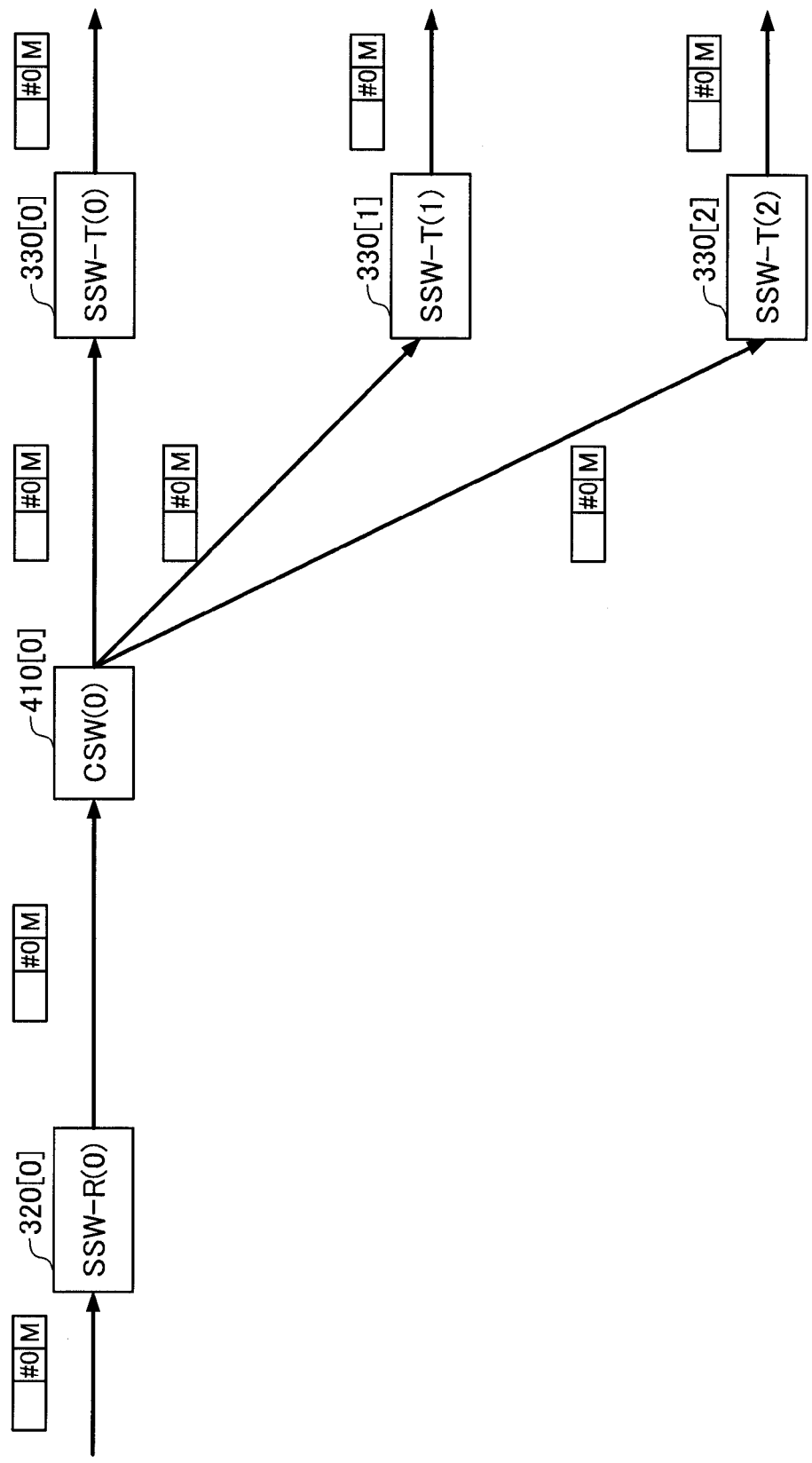
FIG. 10 is an explanatory drawing showing the multicast transfer at the crossbar switch.
Figure 11:
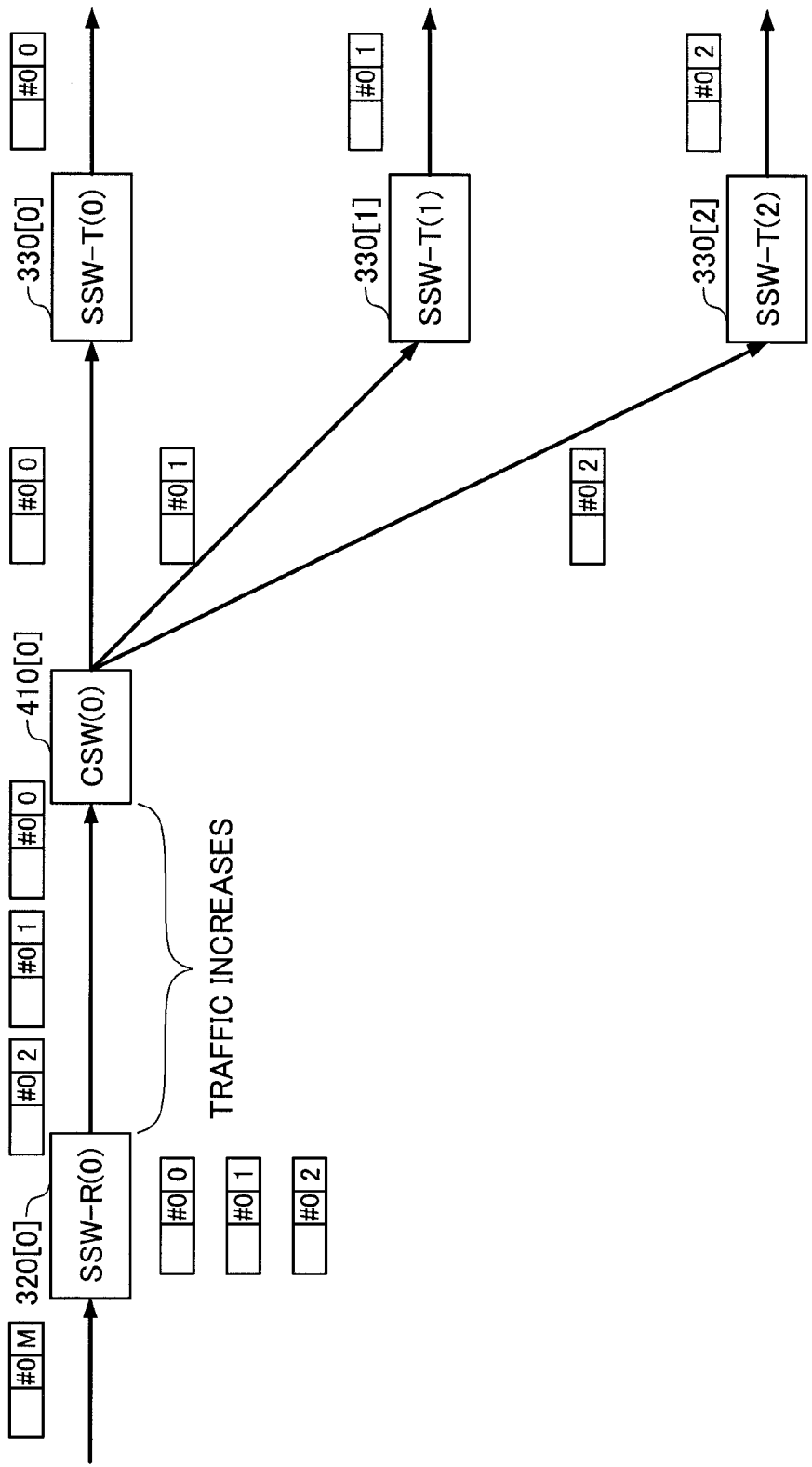
FIG. 11 is an explanatory drawing showing transfer of multicast cell by converting multicast transfer to unicast transfer.
Figure 12:
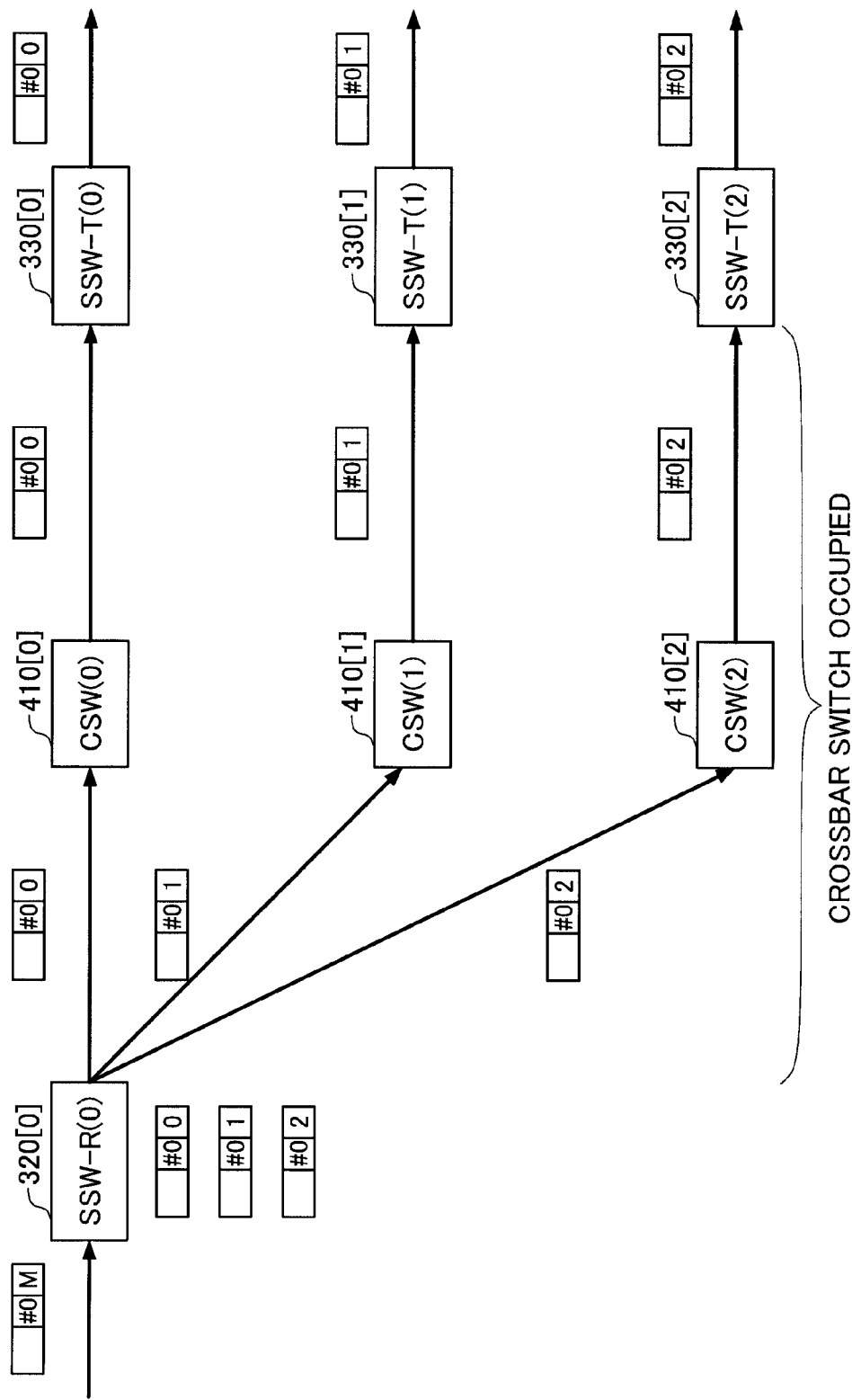
FIG. 12 is an explanatory drawing showing transfer of multicast cell by converting multicast transfer to unicast transfer.

FIG. 10 is an explanatory drawing showing the multicast transfer at the crossbar switch 410. FIG. 11 and FIG. 12 are explanatory drawings showing transfer of multicast cell by converting multicast transfer to unicast transfer.

As shown in FIG. 10, the crossbar switch (CSW) 410[0] is able to transfer the cells transferred from the single receiving side sub crossbar switch (SSW-R) 320[0] to the multiple transmitting side sub crossbar switches (SSW-T) 330[0] to 330[2]. Because of this, as shown in the example in FIG. 10, by performing the multicast transfer at the crossbar switch 410[0], it is possible to suppress an increase in traffic between the receiving side sub crossbar switch 320[0] and the crossbar switch 410[0] even with a single crossbar switch 410[0].

Meanwhile, as shown in FIG. 11, cells are duplicated at the receiving side sub crossbar switch (SSW-R) 320[0], and when the duplicated cells are transferred to the single crossbar switch 410[0], traffic increases between the receiving side sub crossbar switch 320[0] and the crossbar switch 410[0]. Also, as shown in FIG. 12, when duplicated cells are transferred to the plurality of crossbar switches 410[0] to 410[2], the multiple crossbar switches 410[0] to 410[2] are occupied. Thus, when conversion from multicast to unicast is performed to suppress the number of the destination-by-destination CSN setting circuits 614 or the like with the conventional network switch, there is the risk of a drop in the cell transfer speed due to an increase in traffic between the receiving side sub crossbar switch 320 and the crossbar switch 410, or to occupation of the crossbar switch 410.

Figure 13:
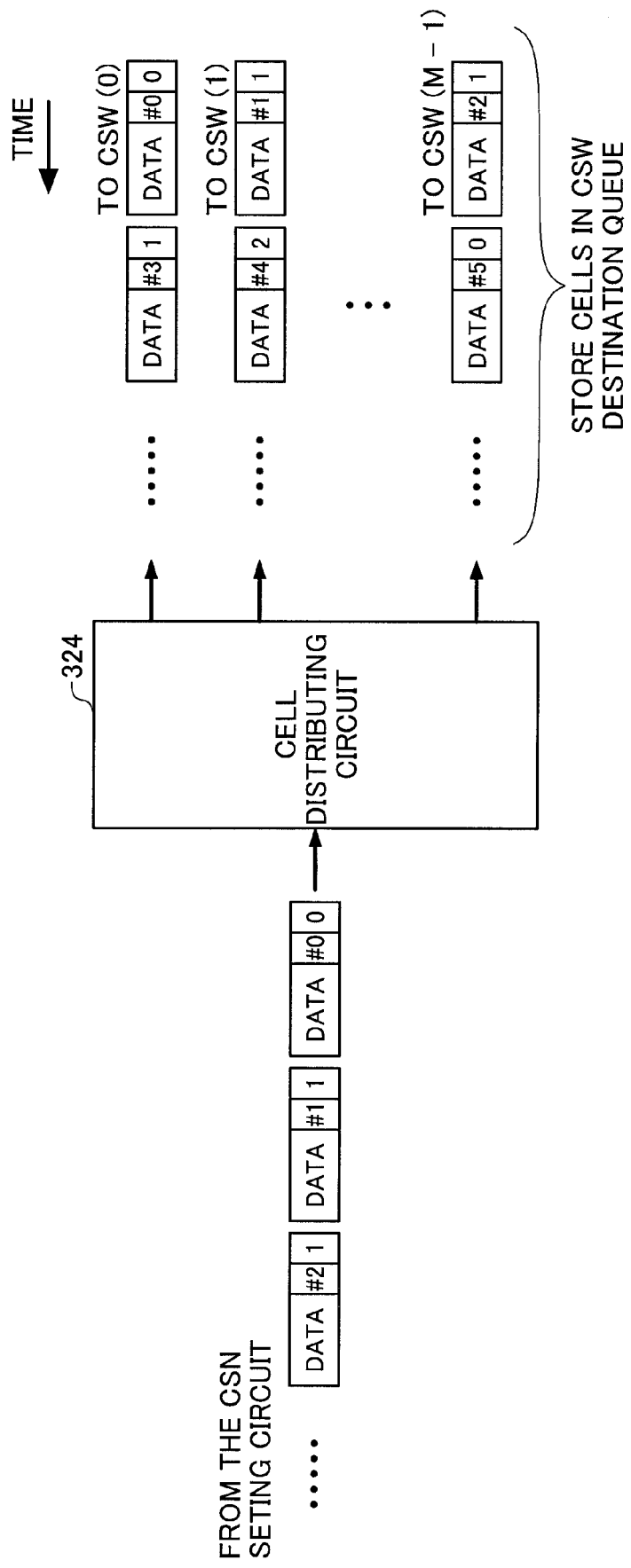
FIG. 13 is an explanatory drawing showing distribution of the cells at the cell distributing circuit.

FIG. 13 is an explanatory drawing showing distribution of the cells at the cell distributing circuit 324 to M crossbar switches (CSW). The cells distributed to the individual crossbar switches 410 are stored in the queue (CSW destination queue) provided between the cell distributing circuit 324 and the crossbar switch 410, and transferred from the beginning of the CSW destination queue in sequence to the crossbar switch 410. The cell transfer destination crossbar switch may be determined using various distribution methods such as round robin. The cell transfer destination crossbar switch is more preferably determined according to the state of the various queues provided in the receiving side sub crossbar switch (SSW-R) 320 and the transmitting side sub crossbar switch (SSW-T) 330 in FIG. 5. In this case, the cell transfer destination may be determined according to the following sequences, for example.

1: A crossbar switch 410 for which the CSW destination queue cell storage count is lower than a predetermined threshold.
2: A crossbar switch 410 for which a transfer limit has not been received (no back pressure is applied) from transmitting side sub crossbar switch (SSW-T) of the destination PPU.
3: A crossbar switch 410 determined by the round robin method.

It is also possible to allot the transfer destination crossbar switches 410 according to whether the transferred cells are unicast or multicast. It is preferable to allot the crossbar switches 410 in this way, in that securing of multicast transfer bandwidth becomes easier.

With the example of FIG. 13, the cell transfer destination is determined by round robin for the crossbar switches 410. As a result, the cells supplied from the CSN setting circuit 322 are transferred in sequence from the crossbar switch 410[0] to the crossbar switch 410[M-1].

Figure 14:
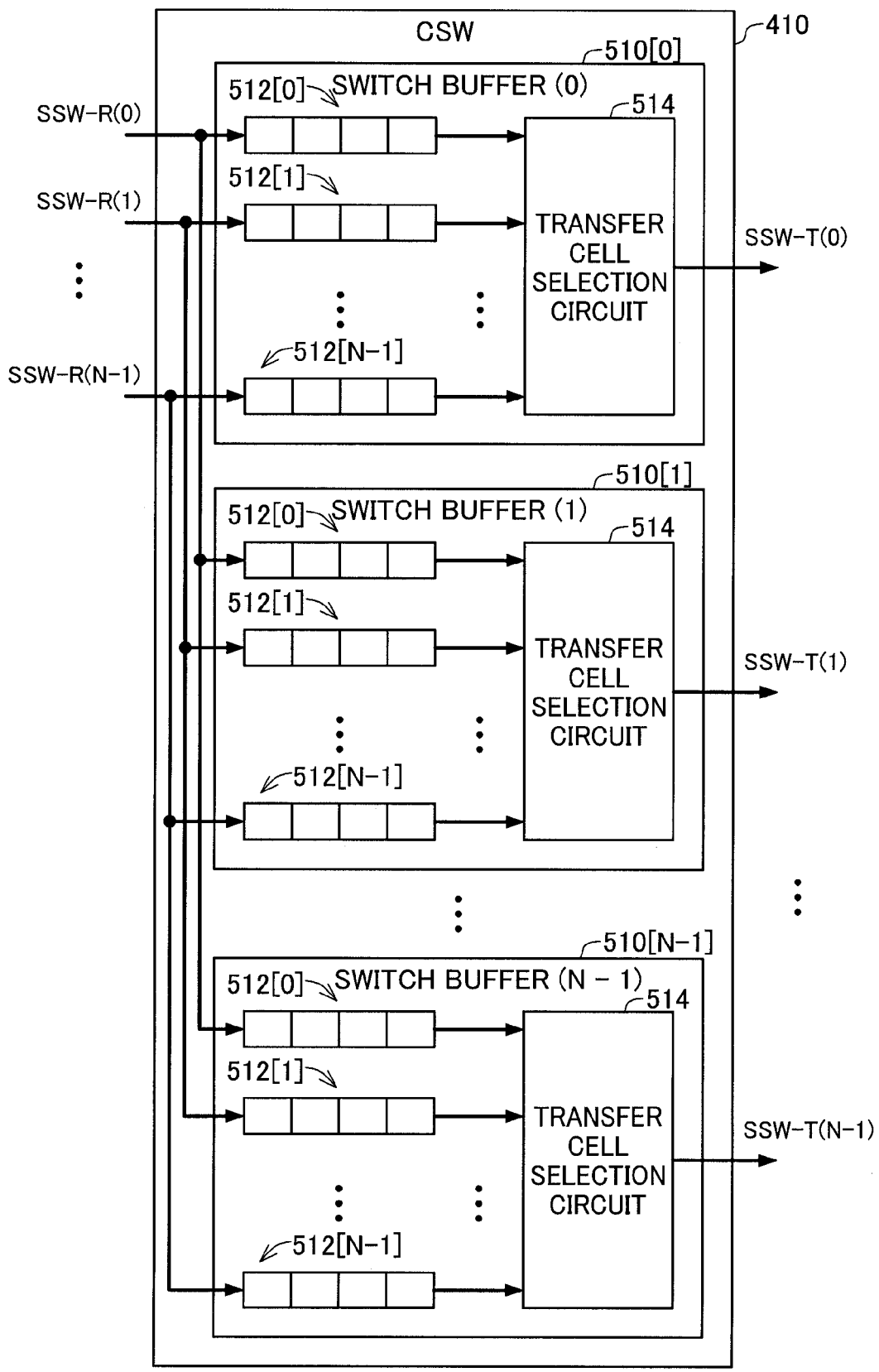
FIG. 14 is an explanatory drawing showing the internal configuration of the crossbar switch.

FIG. 14 is an explanatory drawing showing the internal configuration of the crossbar switch 410. The crossbar switch 410 has N switch buffers 510 corresponding respectively with the N transmitting side sub crossbar switches (SSW-T) which are the cell transfer destinations. Provided at the switch buffer 510 are N internal queues 512, and a transfer cell selection circuit 514 that selects a cell stored in the internal queues 512 and transfers the selected cell to the transmitting side sub crossbar switch.

The cells transferred from the receiving side sub crossbar switch (SSW-R) are allocated according to the transfer destination transmitting side sub crossbar switch (SSW-T) to the respective switch buffers 510. The cells allocated to each switch buffer 510 are stored in the internal queue 512 provided individually for each transfer source.

The transfer cell selection circuit 514 selects a cell transferred by round robin of the cell units in relation to the transfer source, and sends the selected cell to the transmitting side sub crossbar switch (SSW-T) of the transfer destination. As described later, individual queues are provided for each transfer source packet processing unit 300 (specifically, the receiving sub crossbar switch 320) in the cell sorting circuit 332 (FIG. 5) of the transmitting side sub crossbar switch (SSW-T). In light of this, it is preferable to select the transferring cell according to the cell storage amount in the transmitting side sub crossbar switch queue in that the cell transfer to the cell sorting circuit 332 is performed more efficiently. As is clear from the configuration of the crossbar switch 410 shown in FIG. 14, with the crossbar switch 410, transfer sequence of cells transferred from a specific input port to an output port is maintained.

Figure 15:
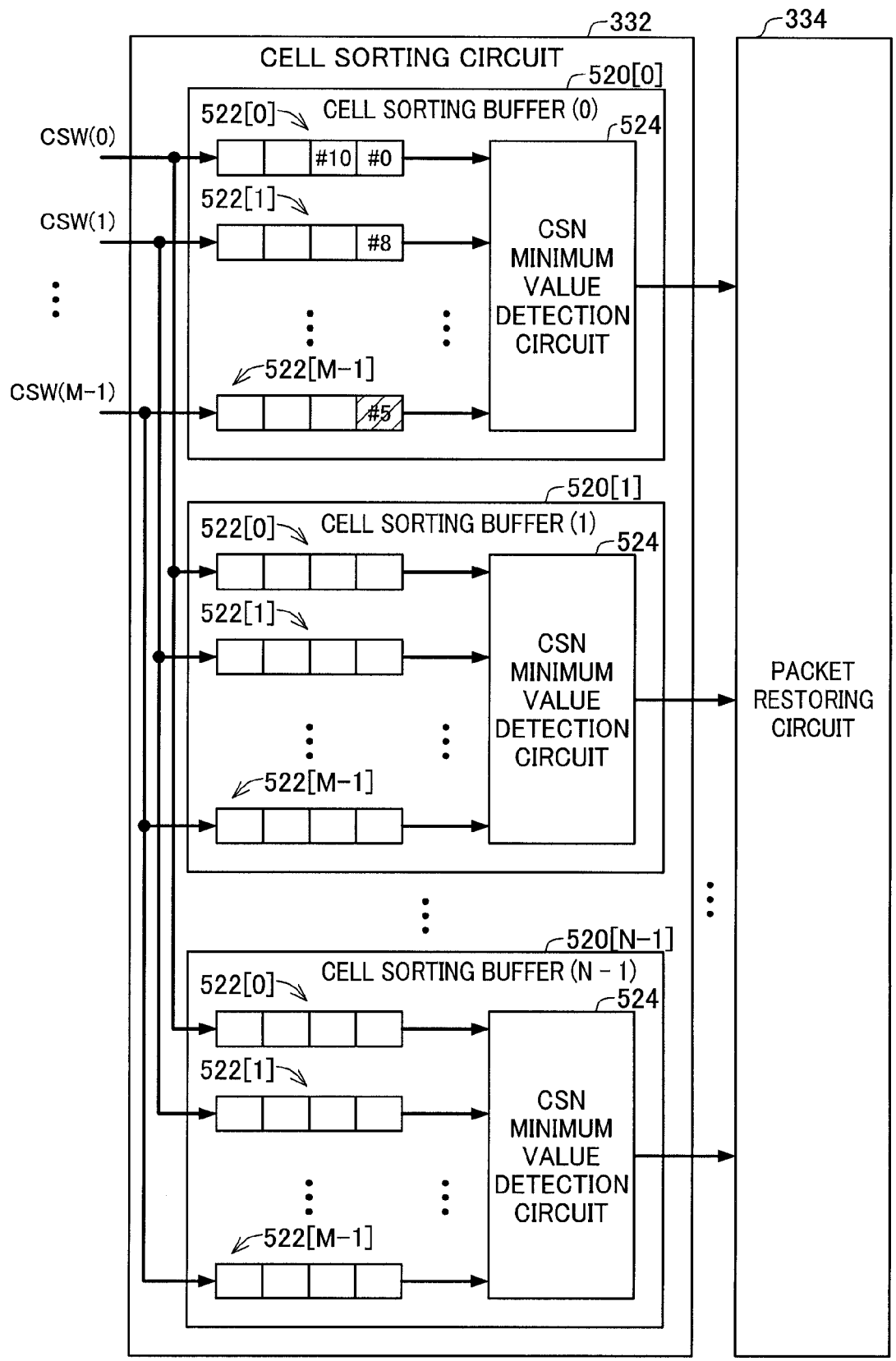
FIG. 15 is an explanatory drawing showing the internal configuration of the cell sorting circuit.

FIG. 15 is an explanatory drawing showing the internal configuration of the cell sorting circuit 332 provided on the transmitting side sub crossbar switch 330 (FIG. 5). The cell sorting circuit 332 has N cell sorting buffers 520 corresponding to the N packet processing units (transmitting source PPUs) as the cell transmitting sources. On each of the respective cell sorting buffers 520 are provided M internal queues 522 corresponding to the M crossbar switches 410 as the cell transfer sources, and a CSN minimum value detection circuit 524 which selects the foremost cell from the cells stored in the internal queue 522 and transfers the selected cell to the packet restoring circuit 334 (FIG. 5).

Figure 16:
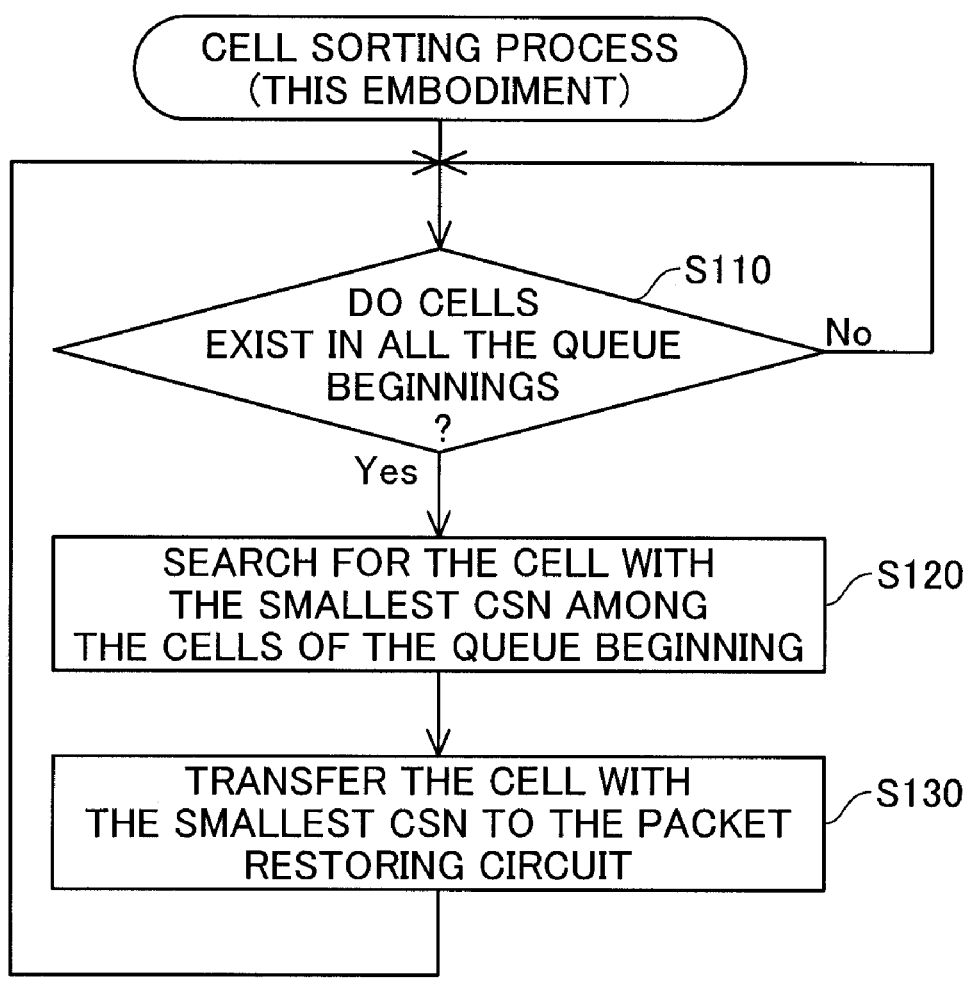
FIG. 16 is a flow chart showing the process that the CSN minimum value detection circuit sorts the cells.

FIG. 16 is a flow chart showing the process that the CSN minimum value detection circuit 524 sorts the cells. This cell sorting process is always executed by the CSN minimum value detection circuit 524 during operation of the network switch 100.

At step S110, the CSN minimum value detection circuit 524 determines whether or not cells exist in all the internal queues 522. When cells exist in all the internal queues 522, the process advances to step S120. When a cell do not exist in any of the internal queues 522, the process returns to step S110, and step S110 is executed repeatedly until cells exist in all the internal queues 522.

At step S120, the CSN minimum value detection circuit 524 searches for the cell with the smallest CSN (CSN minimum cell) among the cells at the beginning of the internal queue 522. Subsequently, at step S130, the CSN minimum cell found at step S120 is transferred to the packet restoring circuit 334 (FIG. 5). After transferring the CSN minimum cell to the packet restoring circuit 334, the process returns to step S110, and steps S110 to S130 are executed repeatedly.

With the example in FIG. 15, cells are stored in each of the respective internal queues 522[0] to 522[M-2] corresponding to the crossbar switches 410[0] to 420[M-2]. When the cell with CSN #5 is stored in the internal queue 522[M-1] (indicated with cross hatching) corresponding to the crossbar switch 410[M-1], it is determined that cells exist in all the internal queues 522[0] to 522[M-1] (step S110). As a result, the cell with the smallest CSN is found (step S120), and the found cell for which the CSN is #0 is transferred to the packet restoring circuit 334 (step S130).

With this embodiment, when the transfer of packets to the packet processing unit 300 is discontinuous, as described above, transfer of a synchronous cell is performed. In this case, by determining whether or not the synchronous cell is stored in the internal queue 522, it is possible to determine whether or not to transfer cells to the packet restoring circuit 334. It is also possible to perform cell transfer without using a synchronous cell by transferring the cell when the time from latest reception of the final reaches a predetermined time. However, it is more preferable to use the synchronous cell in that the processing at the CSN minimum value detection circuit 524 becomes easier.

With this embodiment, when CSN wrap around occurs, as described above, transfer of a cell conveying information on the occurrence of wrap around is performed. This prevents extraction of erroneous cells due to the occurrence of wrap around and transferring of the erroneous cell by the CSN minimum value detection circuit 524. It is also possible to separately receive the notification on the occurrence of wrap around rather than reception of such a cell. However, notification of wrap around by cell transfer is more preferable because it is easier to do synchronization between the CSN setting circuit 322 and the CSN minimum value detection circuit 524 regarding the timing of the wrap around occurrence.

Figure 17:
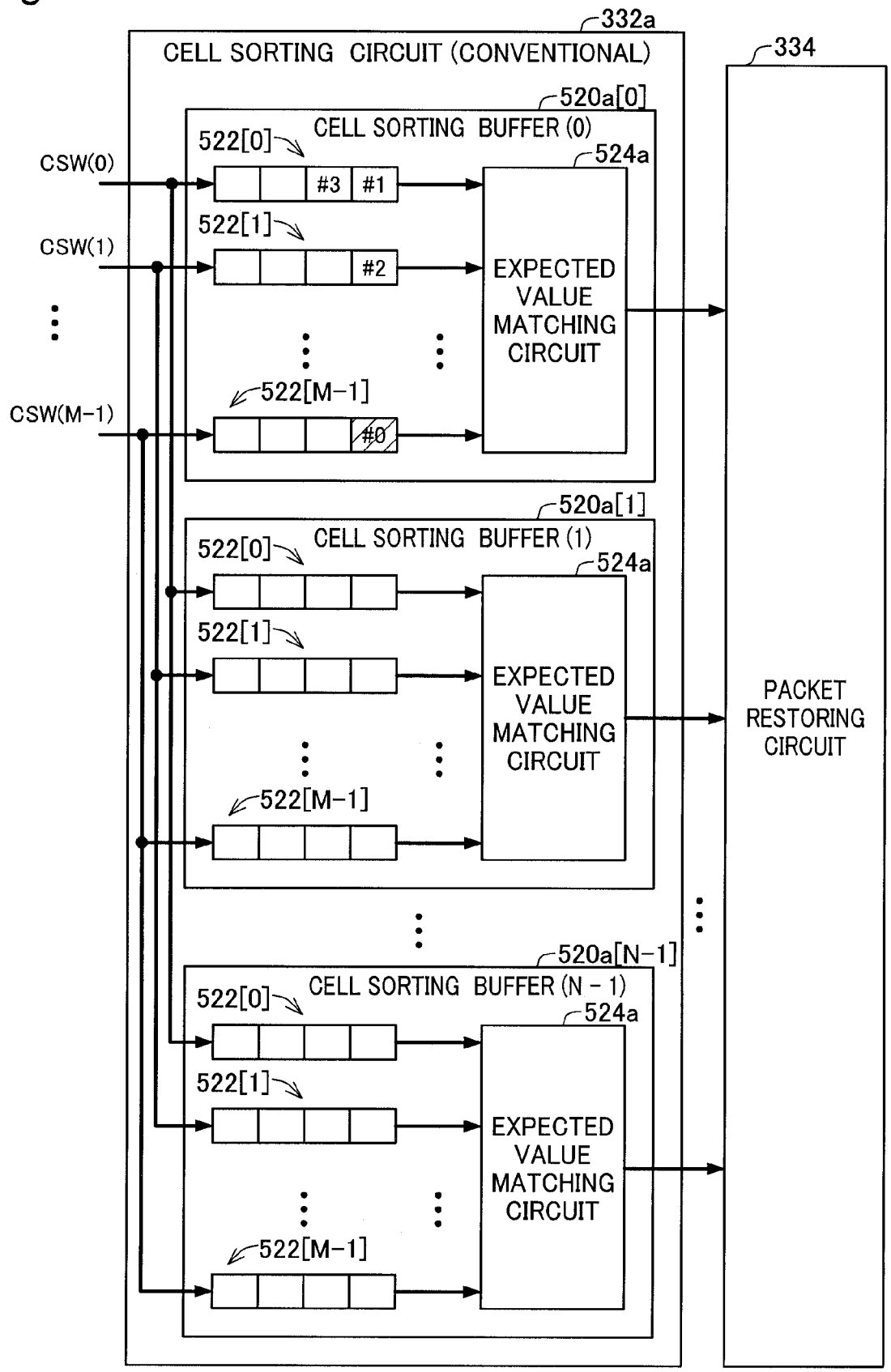
FIG. 17 is an explanatory drawing showing the internal configuration of the conventional cell sorting circuit.

FIG. 17 is an explanatory drawing showing the internal configuration of the conventional cell sorting circuit 332a as a comparative example. The cell sorting circuit 332a is different from the cell sorting circuit 332 of this embodiment shown in FIG. 15 in that an expected value matching circuit 524a is used instead of the CSN minimum value detection circuit 524. The other points are the same as the cell sorting circuit 332. Note that N cell sorting buffers 520 are provided corresponding to the N cell destinations on the cell sorting circuit 332a of FIG. 17. Therefore, when using the cell sorting circuit 332a of FIG. 17, it is not possible to perform multicast transfer at the crossbar switch 410. As described above, when performing multicast transfer at the crossbar switch 410, a greater number of cell sorting buffers 520a than N are provided in the cell sorting circuit 332a.

Figure 18:
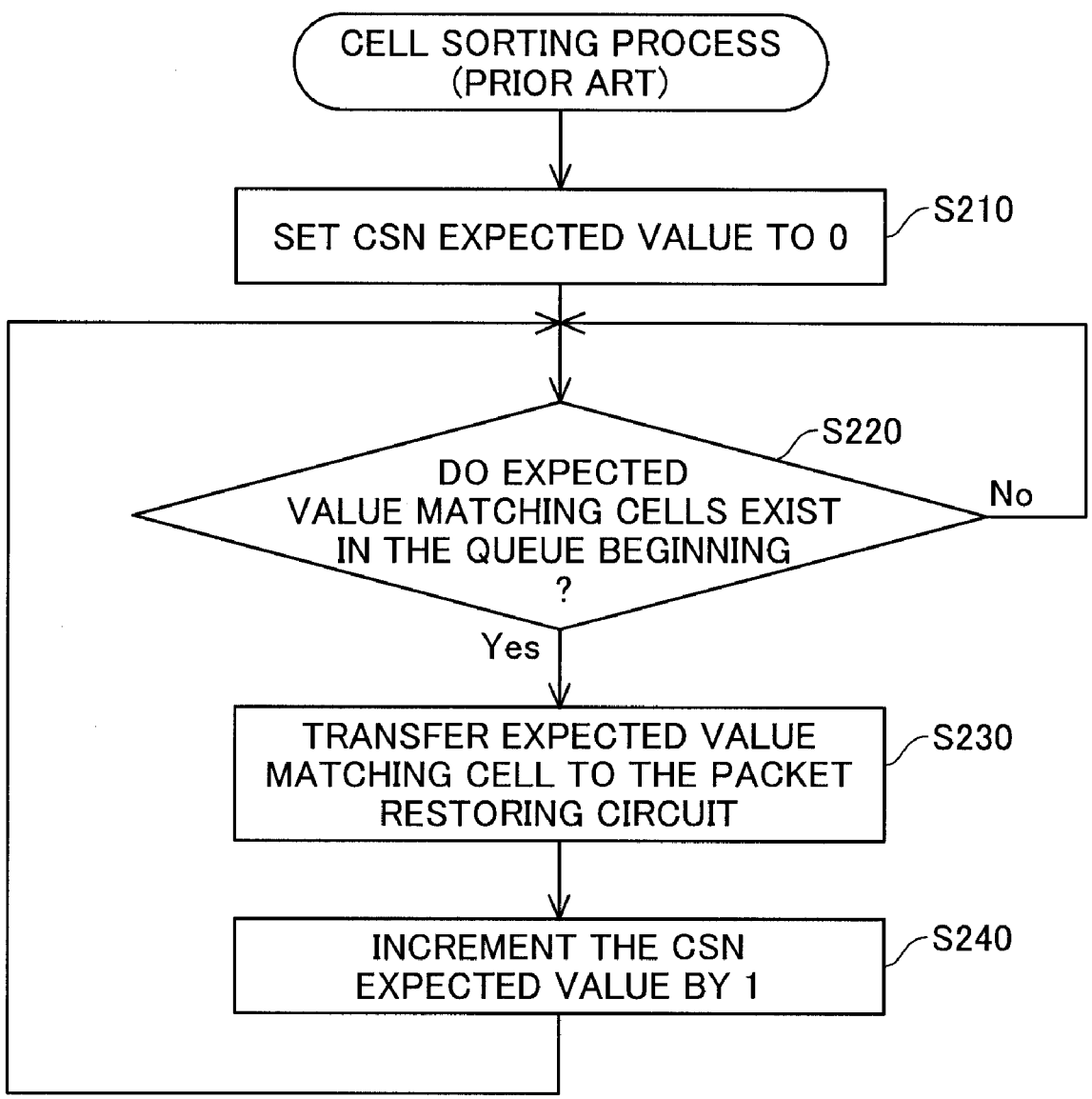
FIG. 18 is a flow chart showing the process that the expected value matching circuit sorts the cells.

FIG. 18 is a flow chart showing the process that the expected value matching circuit 524a sorts the cells. This cell sorting process, the same as the cell sorting process of this embodiment shown in FIG. 16, is always executed by the expected value matching circuit 524a during operation of the network switch 100.

At step S210, the expected value matching circuit 524a sets the CSN expected value to 0. Subsequently, at step S220, the expected value matching circuit 524a determines whether or not a cell for which the CSN matches the expected value (hereafter also referred to as "expected value matching cells") exists in the beginning of the internal queue 522. When an expected value matching cell exists at the beginning of the internal queue 522, the process advances to step S230. Meanwhile, when an expected value matching cell does not exist in the beginning of the internal queue 522, the process returns to step S220, and the step S220 is executed repeatedly until an expected value matching cell exists in the beginning of the internal queue 522.

At step S230, the expected value matching circuit 524a transfers the expected value matching cell to the packet restoring circuit 334 (FIG. 5). Subsequently, at step S240, the expected value matching circuit 524a increments the expected value by 1. After the expected value is incremented, the process returns to step S220, and steps S220 to S240 are executed repeatedly.

The example in FIG. 17 shows the state when the CSN expected value is 0, and cells for which the CSN is larger than the expected value (#0) are stored in the internal queues 522[0] to 522[M-2] corresponding to the crossbar switches 410[0] to 410[M-2]. Here, when a cell for which the CSN is the expected value (#0) is stored in the internal queue 522[M-1] (shown with cross hatching) corresponding to the crossbar switch 410[M-1], it is determined that the expected value matching cell exists in the beginning of the internal queue 522 (step S220). As a result, the expected value matching cell (CSN=0) is transferred from the internal queue 522[M-1] to the packet restoring circuit 334 (step S230).

In this way, with the prior art, as the CSN, a consecutive number is set for each cell destination. With the prior art, the cell sorting circuit 332a is able to specify the CSN of the next cell to be transferred by incrementing the CSN expected value 1 for each transfer of the expected value matching cell to the packet restoring circuit 334. As a result, even when discontinuance of transfer of packets to the packet processing unit 300 (FIG. 5) or wrap around of the CSN occurs, proper transfer of cells to the packet restoring circuit 334 is available. However, as described above, when multicast transfer is performed at the crossbar switch 410, the number of cell sorting buffers 520a provided in the cell sorting circuit 332a becomes greater than with this embodiment. Further, with the prior art, when disappearance of a part of the cells for which the IP packet is divided (cell missing) occurs, the expected value matching circuit 524a is not able to detect the expected CSN and the process stops at step S220. In consequence it is required that the expected value matching circuit 524a increments the CSN expected value by 1 based on the state of the cell sorting buffer 522 and duration since the process stopped at step S220, for example. On the contrary, with this embodiment, even when disappearance of a part of the cells for which the IP packet is divided (cell missing) occurs, it is possible to omit processing of the disappeared cells without stopping the CSN minimum value detection circuit 524.

Figure 19:
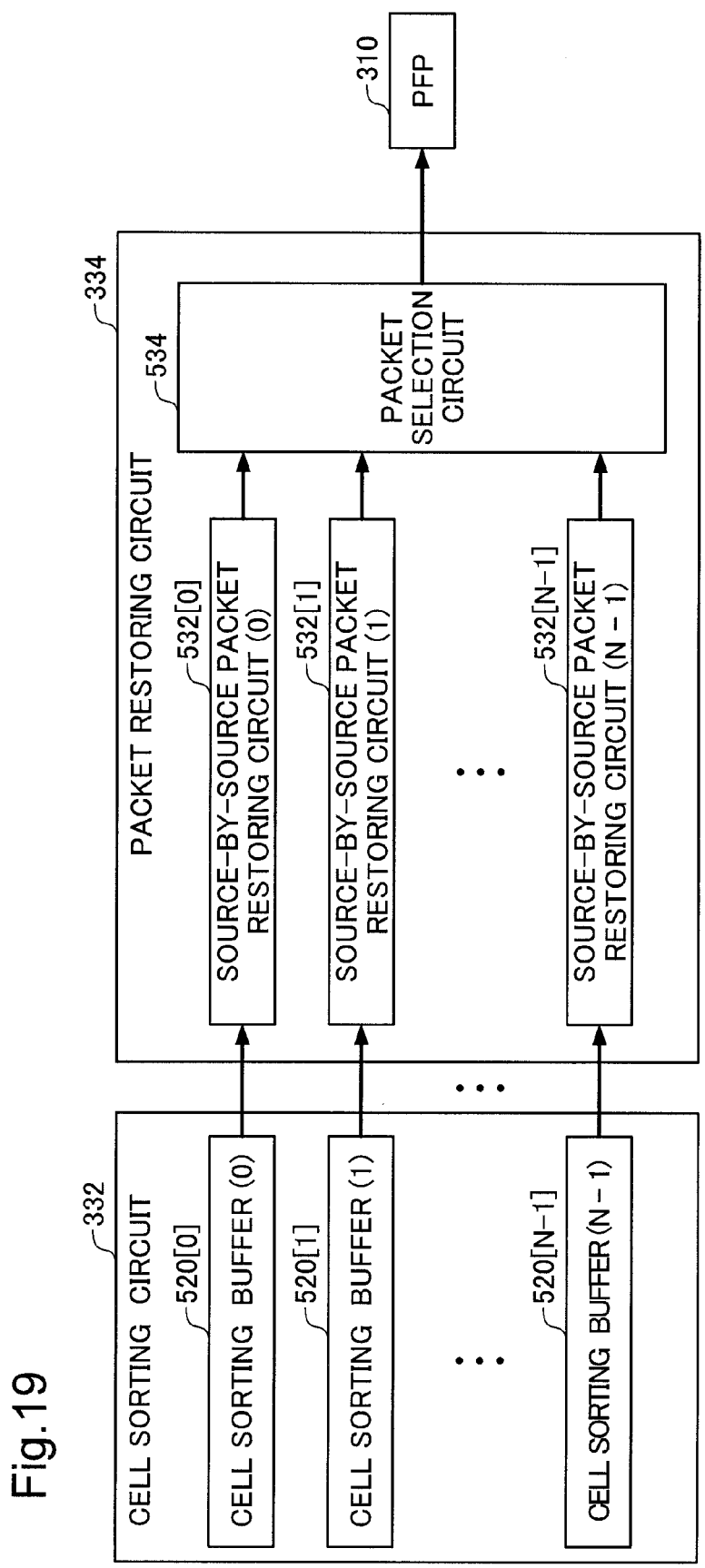
FIG. 19 is an explanatory drawing showing the internal configuration of the packet restoring circuit.

FIG. 19 is an explanatory drawing showing the internal configuration of the packet restoring circuit 334. The packet restoring circuit 334 has a source-by-source packet restoring circuit 532, and a packet selection circuit 534. As shown in FIG. 19, N source-by-source packet restoring circuits 532 corresponding to N cell sorting buffers 520 (FIG. 17) are provided in the packet restoring circuit 334.

The source-by-source packet restoring circuits 532 respectively restore the IP packets before division (FIG. 4) from the already sorted cells transferred from the cell sorting buffer 520. In specific terms, IP packet restoration is performed by removing the cell header from each cell, and by assembling the cell data in the transfer sequence. It is possible to determine whether or not disappearance of a part of the cells for which the IP packet is divided (cell missing) has occurred by referencing the consecutiveness of the CSN of the cells constituting the assembled IP packet and/or the error correction code contained in the IP packet. In this case, the IP packet for which cell missing is determined to have occurred is discarded in IP packet basis.

The packet selection circuit 534 selects a packet to transfer to the packet forwarding processor 310 (FIG. 1) using a method such as round robin in relation to the transmitting source PPU, and transfers the selected packet to the packet forwarding processor 310 from each source-by-source packet restoring circuit 532. The packet forwarding processor 310 transfers packets transferred from the transmitting side sub crossbar switch 330 to a port (not illustrated) provided in the packet forwarding processor 310 based on routing information supplied from the routing controller 340 (FIG. 3). In this way, the network switch 100 achieves packet switching by transferring packets received from the specific port to a port determined based on routing information.

With this embodiment, by setting the CSNs in the transfer sequence regardless of the cell destination, it is possible to set CSNs to cells by a single CSN setting circuit 322, and it is also possible to suppress the number of cell sorting circuits 332 to the number of transmitting source PPUs. Thus, with this embodiment, it is possible to suppress an increase in the circuit scale of the network switch 100. In particular, when performing multicast transfer at the crossbar switch 410, it is possible to suppress a rapid increase in the number of CSN setting circuits 322 and cell sorting circuits 332. As a result, it is possible to more easily perform multicast transfer at the crossbar switch 410, and to reduce traffic between the receiving side sub crossbar switches 320 and the crossbar switches 410.

B. Modifications

The present invention is not limited to the examples and embodiments described above and may be reduced to practice in various forms without departing the scope thereof including, for example, the following modifications.

Figure 4:
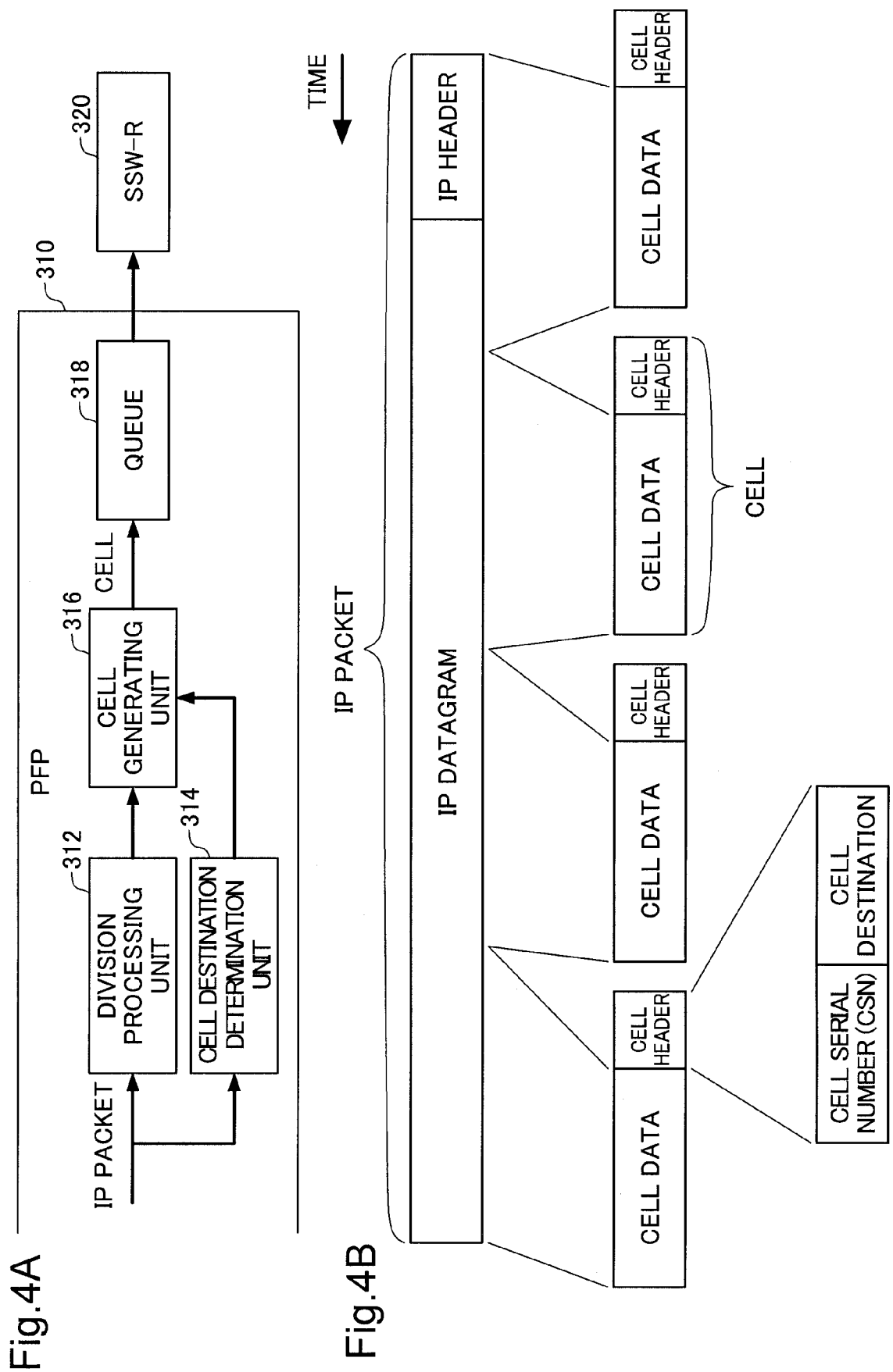
FIGS. 4A and 4B are explanatory drawings showing division of the received packet into cells.

B1. Modification 1:

With the embodiment hereinabove, as shown in FIG. 4, cells for which the IP packet is divided are transferred to the receiving side sub crossbar switch (SSW-R) 320, and cells supplied from the receiving side sub crossbar switch 320 are transferred by the crossbar switch 410 (FIG. 5). The data transferred by the crossbar switch is not limited to cells. Any unit data of a specified format such as IP packets may be transferred by the crossbar switch if the transmitting side requires to guarantee identity of transfer sequence. It is more preferable to transfer cells for which the packet is divided, because the crossbar switch 410 is suitable for transferring cells of a fixed data length in general.

B2. Modification 2:

With the embodiment hereinabove, the determination of the transferring cell at the transfer cell selection circuit 514 (FIG. 14), or the determination of the transferring packet at the packet selection circuit 534 (FIG. 19) are performed using a selection means such as round robin. In addition to the method described in the embodiment hereinabove, it is also possible to determine the cell or packet to be transferred based on the quality of service (QoS) of the data transfer. In this case, the cell or the packet with a high demand level for QoS is selected with priority, and regarding the other cells and packets, transfer is stopped (time out) after the elapse of a specified time.

B3. Modification 3:

With the embodiment hereinabove, the source-by-source packet restoring circuit 532 (FIG. 19) determines whether or not disappearance of a part of the cells for which the IP packet is divided (cell missing) has occurred by referencing the consecutiveness of the CSN of the cells constituting the assembled IP packet and/or the error correction code contained in the IP packet. Instead of the method described in the embodiment hereinabove, it is also possible to determine whether or not the IP packets are suitably restored by appending an identifier, which indicates the position within the divided IP packet, in the cell header and by referencing this identifier.

Figure 20:
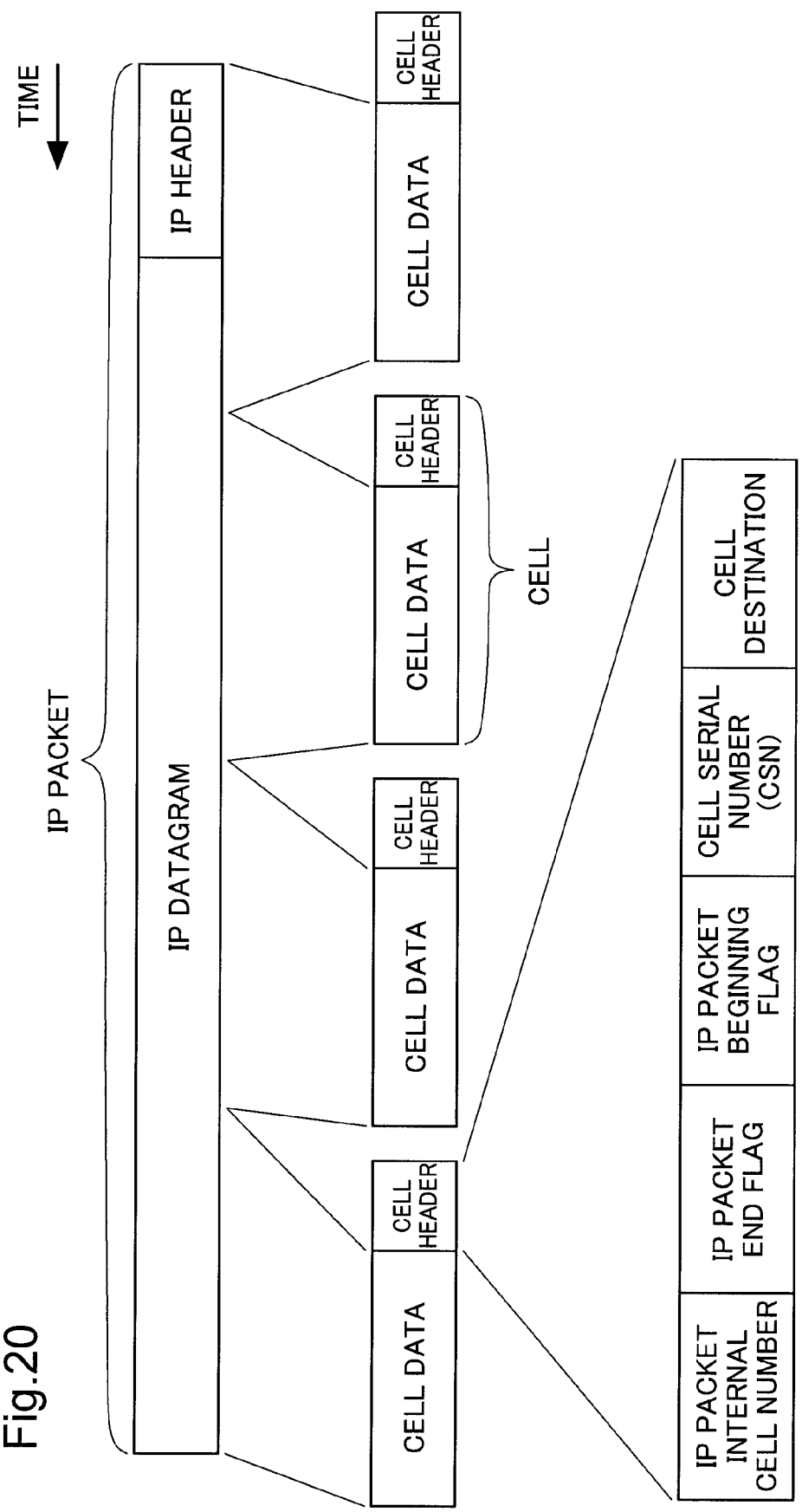
FIG. 20 is an explanatory drawing showing example of the cell header to which the identifier of this modification is appended.

FIG. 20 is an explanatory drawing showing example of the cell header to which the identifier of this modification is appended. In specific terms, the cell header has an identifier consisting of a flag indicating the beginning of the IP packet, a flag indicating the end of the IP packet, and the area in which consecutive cell number within the IP packet are stored. In order to determine whether or not the IP packet is suitably restored, the cell generating unit 316 (FIG. 4) generates the identifier, and the source-by-source packet restoring circuit 532 (FIG. 19) refers the model identifier.

In this case, it is possible to determine whether or not the IP packet is suitably restored by sequentially referencing the cell header in the transfer sequence without referencing the entire IP packet. This allows facilitation of such a determination. With the third modification, since consecutiveness of the CSNs of the cells within the IP packet is not necessary, when the cell transfer destinations are not overlapping, the packet forwarding processor 310 (FIG. 3) is able to transfer cells to the receiving side sub crossbar switch 320 (FIG. 3) not in the divided packet basis.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A network switch comprising:
a plurality of crossbar switches that transfer unit data in a specified format;
a receiving side transfer unit that transfers data received from a network to the plurality of crossbar switches in the unit data basis; and
a plurality of transmitting side transfer units that transmit data transferred from the plurality of crossbar switches to the network,
wherein the receiving side transfer unit has:
a serial number setting unit that sets a consecutive serial number to the unit data in transfer sequence to the crossbar switches regardless of whether transfer destination of the data unit with the crossbar switch is same or not and further whether transfer destination of the data unit with the crossbar switch is single or a plurality, and
a distributing unit that distributes the unit data to the plurality of crossbar switches, the unit data to be distributed being set the serial number,
each of the plurality of transmitting side transfer units has:
a plurality of queues that individually stores the unit data transferred from each crossbar switch for the respective crossbar switches, wherein the number of queues is equal to the number of crossbar switches, and
a unit data extraction unit that extracts the unit data with smallest serial number of the unit data stored at beginning of the plurality of queues when all of the plurality of queues store the unit data.

2. The network switch according to claim 1, wherein the receiving side transfer unit transfers synchronous unit data for causing a specific transmitting side transfer unit to extract the unit data when the receiving side transfer unit does not receive data to be transferred to the specific transmitting side transfer unit for a specific duration.

3. The network switch according to claim 1, wherein the serial number setting unit generates wrap around notification unit data for notifying occurrence of wrap around to the plurality of transmitting side transfer units when wrap around occurs with the serial number.

4. The network switch according to claim 1, wherein the unit data is a cell of a specified data length,
the receiving side transfer unit has a packet dividing unit that divides a packet received by the network switch into a plurality of cells, and that transfers the cells to the serial number setting unit in the packet basis, and
each of the transmitting side transfer units has a packet restoring unit that restores the packet from the cells transferred from the crossbar switches.

5. The network switch according to claim 4, wherein the packet dividing unit has an identifier appending unit that appends an identifier to each of the plurality of the cells, the identifier indicating a position of each of the cell within the packet, and
the packet restoring unit has an identifier determination unit that determines whether or not the packet is able to be suitably restored based on the identifier appended to each of the cells.

6. The network switch according to claim 1, wherein each of the crossbar switch is configured so as to be able to transfer a single unit data supplied from the receiving side transfer unit to at least two transmitting side transfer units among the plurality of transmitting side transfer units as individual unit data that are corresponding to the at least two transmitting side transfer units.

7. A switching method for switching data in a network using a plurality of crossbar switches that transfer unit data of a specified format, comprising:
(a) transferring a data received from the network to the plurality of crossbar switches in the unit data basis; and
(b) transmitting the data transferred from the plurality of crossbar switches in the unit data basis to the network;
wherein the step (a) including:
setting a consecutive serial number to the unit data in transfer sequence to the crossbar switches regardless of whether transfer destination of the unit data by the crossbar switch is same or not and further whether transfer destination of the data unit with the crossbar switch is single or a plurality, and
distributing the unit data to the plurality of crossbar switches, the unit data to be distributed being set the serial number, and
the step (b) including:
individually storing the unit data transferred from each crossbar switch for the respective crossbar switches to queues wherein the number of queues is equal to the number of crossbar switches, and
extracting the unit data with smallest serial number of the stored unit data when the unit data for all of the plurality of crossbar switches are stored.

* * * * *